(12) United States Patent
Sasada et al.

(10) Patent No.: US 6,952,581 B2
(45) Date of Patent: Oct. 4, 2005

(54) LOCATION REGISTRATION CONTROL METHOD, MOBILE COMMUNICATION NETWORK, AND COMMUNICATION TERMINAL

(75) Inventors: Koji Sasada, Kamakura (JP); Masami Yabusaki, Kashiwa (JP)

(73) Assignee: NTT DoCoMo, Inc., Tokyo (JP)

( * ) Notice: Subject to any disclaimer, the term of this patent is extended or adjusted under 35 U.S.C. 154(b) by 627 days.

(21) Appl. No.: 09/997,399

(22) Filed: Nov. 28, 2001

(65) Prior Publication Data

US 2002/0072369 A1 Jun. 13, 2002

(30) Foreign Application Priority Data

Nov. 28, 2000 (JP) ........................................ 2000-361797

(51) Int. Cl.[7] .............................................. H04Q 7/20
(52) U.S. Cl. ................................ 455/432.3; 455/435.3
(58) Field of Search ........................... 455/404.2, 414.2, 455/425, 432.3, 433, 434, 435.1, 435.3, 452.1, 456.1, 456.2, 456.3, 458, 464, 446, 422.1, 443

(56) References Cited

U.S. PATENT DOCUMENTS

| | | | | |
|---|---|---|---|---|
| 5,375,104 A | * | 12/1994 | Ishii et al. ........................ | 368/22 |
| 5,818,920 A | * | 10/1998 | Rignell et al. ......... | 379/211.02 |
| 5,832,381 A | | 11/1998 | Kauppi | |
| 6,101,388 A | | 8/2000 | Keshavachar | |
| 6,363,255 B1 | | 3/2002 | Kuwahara | |

FOREIGN PATENT DOCUMENTS

| | | |
|---|---|---|
| CN | 1133668 A | 10/1996 |
| EP | 0 666 700 A1 | 1/1995 |
| JP | H02-109431 A | 4/1990 |
| JP | H05-056472 A | 3/1993 |
| JP | H08-084364 A | 3/1996 |
| JP | H08-503588 A | 4/1996 |
| JP | 2000-134662 A | 5/2000 |
| WO | WO 94/13114 A1 | 6/1994 |
| WO | WO 00/03557 | 1/2000 |

OTHER PUBLICATIONS

Hu, L–R and S. S. Rappaport, "An Adaptive Location Management Scheme for Global Personal Communications", 1995 Fourth IEEE International Conference on Universal Personal Communications Record, Gateway to the 21st Century, Tokyo, Nov. 6–10, 1995, IEEE International Conference on Universal Personal Communications, IEEE, New York, USA.

* cited by examiner

Primary Examiner—Jean Gelin
(74) Attorney, Agent, or Firm—Brinks Hofer Gilson & Lione

(57) ABSTRACT

A mobile communication network includes a plurality of section patterns, each of which is used to section a communication service area into a plurality of location areas. A base station transmits a control signal which includes a plurality of location area IDs corresponding to the section patterns. A cellular phone selects a location area ID of a location area which is obtained by using a section pattern corresponding to the mobile station usage category of the cellular phone, among the plurality of location area IDs contained in the control signal received from the base station, and performs location registration processing by use of the selected location area ID.

20 Claims, 24 Drawing Sheets

| MOBILE STATION ID | MOBILE STATION USAGE CATEGORY NO. |
|---|---|
| 090-1000-0001 | 2 |
| 090-1000-0002 | 1 |
| 090-1000-0003 | 3 |
| ⋮ | ⋮ |

| MOBILE STATION USAGE CATEGORY NO. | LOCATION AREA ID | SWITCH ID |
|---|---|---|
| 1 | LOCATION AREA ID = SWITCH ID ||
| 2 | #201 | 001、002、007、008 |
|   | #202 | 003、004、009、010 |
|   | #203 | 005、006、011、012 |
|   | #204 | 013、014、019、020 |
|   | #205 | 015、016、021、022 |
|   | ⋮ | ⋮ |
| 3 | #301 | 001、002、007、008、009、013、014 |
|   | #302 | 010、011、015、016、017、022、023 |
|   | ⋮ | ⋮ |
| 4 | #401 | 001、002、003、007、008、009 013、014、015、019、020、021 |
|   | #402 | 004、005、006、010、011、012 016、017、018、022、023、024 |
|   | ⋮ | ⋮ |
| 5 | #501 | 001、007、008、009、010、013、014 015、016、017、022、023、024、029 |
|   | #502 | 019、020、021、025、026、027 ⋯⋯ |
|   | ⋮ | ⋮ |

|MOBILE STATION ID|LOCATION AREA ID|
|---|---|
|090-1000-0001|#201|
|090-1000-0002|008|
|090-1000-0003|#302|
|⋮|⋮|

60a

| SWITCH ID (MOBILE STATION USAGE CATEGORY NO. 1) | 015 |
|---|---|

711a

711b

| MOBILE STATION USAGE CATEGORY NO. | LOCATION AREA ID |
|---|---|
| 2 | #205 |
| 3 | #302 |
| 4 | #401 |
| 5 | #501 |

FIG. 25

| TIME ZONE | MOBILE STATION USAGE CATEGORY NO. |
|---|---|
| 0:00 ~ 7:00 | 1 |
| 7:00 ~ 8:00 | 5 |
| 8:00 ~ 20:00 | 1 |
| 20:00 ~ 21:00 | 5 |
| 21:00 ~ 0:00 | 1 |

960

LOCATION REGISTRATION CONTROL METHOD, MOBILE COMMUNICATION NETWORK, AND COMMUNICATION TERMINAL

BACKGROUND OF THE INVENTION

1. Field of the Invention

The present invention relates to a location registration control method for registering the location of a communication terminal served by a mobile communication network, as well as to a mobile communication network and a communication terminal using the method.

2. Description of the Related Art

In a mobile communication system which comprises a mobile communication network including base stations, switches, and other facilities, and mobile stations such as cellular phones in the mobile communication network, a communication service area is composed of a plurality of location areas. To be able to issue an incoming call request to any mobile station, the mobile communication network of such a mobile communication system must track each mobile station; i.e., must determine the location area where each mobile station is located within the communication service area. Therefore, the mobile communication network performs so called location registration processing for registering, in response to a location registration request from each mobile station, identification information of a location area in which the mobile station is present.

To effect location registration processing, each mobile station transmits a location registration request signal to the mobile communication network when, for example, the mobile station detects a change in its position to another location area.

In a conventional mobile communication system, sections of location areas i.e., boundaries between location areas within a communication service area are fixed. In other words, location areas comprise fixed sections. Therefore, a mobile station which is operated in a transportation means moving at speed within an area which is large relative to a size of location areas must frequently transmit a location registration request signal to the mobile communication network.

By contrast, when an incoming call directed to a mobile station within a location area occurs, all switches and base stations located within the location area within which the mobile station is present issue paging signals simultaneously. That is, at the time of an incoming call, a mobile station which moves within a limited area in a location area generates the same volume of traffic as a mobile station of an owner moving widely within a location area.

As has been described, in the conventional mobile communication system, unnecessary traffic is generated for location registration and incoming calls, and this problem has not been satisfactorily solved.

SUMMARY OF THE INVENTION

It is therefore an object of the present invention to provide a location registration control method, a mobile communication network, and a communication terminal, the use of which enables the elimination of unnecessary traffic in the mobile communication network, which is normally generated for location registration and incoming calls.

In order to achieve the stated object, the present invention provides a location registration control method, comprising the steps of: broadcasting by a mobile communication network in a plurality of types of location areas, area identification information on said plurality of types of location areas, with each location area being included in one of a plurality of types of location area groups overlaying a communication service area, and each location area group being obtained by sectioning said communication service area into location areas by using one of a plurality of types of section patterns; receiving at a communication terminal located within said communication service area, said area identification information on said plurality of types of location areas corresponding to a location of said terminal; selecting at said communication terminal on the basis of said received area identification information on said plurality of types of location areas, a location area identification corresponding to a section pattern predetermined for use with said communication terminal; and transmitting from said communication terminal to said mobile communication network, when a change in location of said communication terminal is indicated by a change in said location area identification selected in said terminal, a request for registration of said location change of said communication terminal in said network.

In a preferred embodiment, each of said plurality of types of section patterns is used to section said communication service area such that the size of a location area differs depending on the type of section pattern to which it belongs.

In another preferred embodiment, each of said plurality of types of section patterns is used to section said communication service area such that the shape of a location area differs depending on the type of section pattern to which it belongs.

Preferably, said communication service area of said mobile communication network consists of a plurality of radio cells; each one of said section patterns is used to section said communication service area consisting of said plurality of radio cells into a plurality of location areas, each of which comprises one or a plurality of radio cells; and each one of said one or a plurality of radio cells is covered by one or a plurality of base stations performing radio communication with communication terminals. In this case, said step of broadcasting area identification information includes broadcasting, from said one or plurality of base stations and through a control channel, area identification information on said plurality of types of location areas.

In another preferred embodiment, a location registration control method further comprises the step of notifying, by said mobile communication network, said communication terminal of information specifying one of said plurality of types of section patterns.

Preferably, said section pattern predetermined for use with said communication terminal is decided by a user of said communication terminal and a service operator managing said mobile communication network on the basis of a projected usage pattern of said communication terminal.

Preferably, said section pattern predetermined for use with said communication terminal may be decided by a service operator managing said mobile communication network on the basis of a projected frequency of calls incoming to said communication terminal or on the basis of a projected movement range of said communication terminal.

In another preferred embodiment, a plurality of section patterns are designated corresponding to a plurality of different time zones for said communication terminal; the method further comprising the step of recording, at said communication terminal, the current time at which said area identification information is received; and wherein said step of selecting a location area identification includes obtaining at said communication terminal information designating a section pattern corresponding to said recorded current time, on the basis of said information designating section patterns, so as to select a location area identification corresponding to said information designating a section pattern.

The present invention further provides a location registration control method, comprising the steps of: storing, at a communication terminal, data showing correspondence between a plurality of grouped location areas and radio cells belonging to each location area, each group being obtained by sectioning a communication service area into location areas by using one of a plurality of types of section patterns; broadcasting, by said mobile communication network in each of radio cells constituting said communication service area, cell identification information on said each one of radio cells; receiving, at said communication terminal located in said communication service area, cell identification information on a radio cell where said communication terminal is presently located; selecting, at said communication terminal as area identification information of a location area designating its own location on the basis of said received cell identification information and said stored data, area identification information corresponding to a section pattern predetermined for use with the communication terminal; and transmitting from said communication terminal to said mobile communication network, when a change in location of said communication terminal is indicated by a change in said location area identification selected in said terminal, a request for registration of said location change of said communication terminal in said network.

In a preferred embodiment, said data showing said correspondence includes area identification information only on a location area group corresponding to a section pattern predetermined for use with said communication terminal. Also, said data showing said correspondence may be transmitted from said mobile communication network to said communication terminal.

The present invention further provides mobile communication networks and communication terminals comprising means of performing various embodiments of the above location registration control method.

For example, the present invention provides a mobile communication network comprising: storage means for storing data showing correspondence between a plurality of grouped location areas and radio cells belonging to each location area, each group being obtained by sectioning a communication service area into location areas by using one of a plurality of types of section patterns; broadcasting means for broadcasting, in a plurality of types of location areas, area identification information on said plurality of types of location areas; receiving means for receiving a signal requesting location registration from a communication terminal; and registering means for registering in a location register, in the case of receiving a signal requesting location registration by said receiving means, a location area identification where said communication terminal is located as location information of said communication terminal, said location area identification being included in said signal requesting said location registration.

The present invention provides another mobile communication network, comprising: storage means for storing data showing correspondence between a plurality of grouped location areas and radio cells belonging to each location area, each group being obtained by sectioning a communication service area into location areas by using one of a plurality of types of section patterns; transmitting means for transmitting, to a communication terminal, said data stored in said storage means; broadcasting means for broadcasting, in each of radio cells constituting said communication service area, cell identification information of said each one of radio cells; receiving means for receiving, from said communication terminal, a signal requesting location registration; and registering means for registering in a location register, in the case of receiving a signal requesting location registration by said receiving means, a location area identification where said communication terminal is located as location information of said communication terminal, said location area identification being included in said signal requesting said location registration.

The present invention provides another mobile communication network, comprising: storage means for storing data showing correspondence between a plurality of grouped location areas and radio cells belonging to each location area, each group being obtained by sectioning a communication service area into location areas by using one of a plurality of types of section patterns; transmitting means for transmitting, to a communication terminal, data of a section pattern decided based on a usage pattern of said communication terminal after reading said data from said storage means; broadcasting means for broadcasting, in each of radio cells constituting said communication service area, cell identification information of said each of radio cells; receiving means for receiving, from said communication terminal, a signal requesting location registration; and registering means for registering in a location register, in the case of receiving a signal requesting location registration by said receiving means, a location area identification where said communication terminal is located as location information of said communication terminal, said location area identification being included in said signal requesting said location registration.

The present invention further provides a communication terminal, comprising: receiving means for receiving, from a mobile communication network, area identification information on a plurality of types of location areas corresponding to a location of said terminal, with each location area being included in one of a plurality of types of location area groups overlaying a communication area, each location area group being obtained by sectioning said communication service area into location areas by one of a plurality of types of section patterns; storage means for storing information designating, on the basis of said plurality of types of section patterns, a section pattern of a location area to be used for location registration of said communication terminal; selecting means for selecting, on the basis of area identification information of said plurality of types of location areas received by receiving means, a location area identification corresponding to said information designating a section pattern stored in said storage means; and transmitting means for transmitting to a mobile communication network, when a change in its own location is indicated by a change in said location area identification selected in said selecting means, a request for registration of said location change in said network.

Preferably, the communication terminal further comprises time keeping means for recording the current time at which area identification information on said plurality of types of location areas is received by said receiving means; and wherein said storage means stores information designating a location area section pattern to be used for said communication terminal corresponding to each time zone, on the basis of said plurality of types of section patterns; and wherein said selecting means for selecting on the basis of area identification information on said plurality of types of location areas received by said receiving means, a location area identification corresponding to information designating a section pattern after obtaining from said storage means information designating a section pattern corresponding to the current time recorded by said time keeping means. The communication terminal may be a portable phone.

The present invention provides another communication terminal, comprising: storage means for storing data showing correspondence between a plurality of grouped location areas and radio cells belonging to each location area, after receiving said data from a mobile communication network, each group being obtained by sectioning a communication service area into location areas by using one of a plurality of types of section patterns; receiving means for receiving from said mobile communication network cell identification information of a radio cell where said communication terminal is presently located; selecting means for selecting on the basis of said cell identification information received by said receiving means and said data stored in said storage means, a location area identification where said communication terminal is presently located; and transmitting means for transmitting to a mobile communication network, when a change in its own location is indicated by a change in said location area identification selected in said selecting means, a request for registration of said location change in said network. Preferably, said communication terminal is a portable phone.

In The present invention is able to eliminate unnecessary traffic in the mobile communication network, which would otherwise be generated for location registration and incoming calls.

BRIEF DESCRIPTION OF THE DRAWINGS

FIG. 10 is a diagram showing an example data configuration of a location area management table provided in the memory of the management server according to the first embodiment;

FIG. 25 is a diagram showing an example data configuration of a time zone management table according to a first modification;

DETAILED DESCRIPTION

Figure 1:
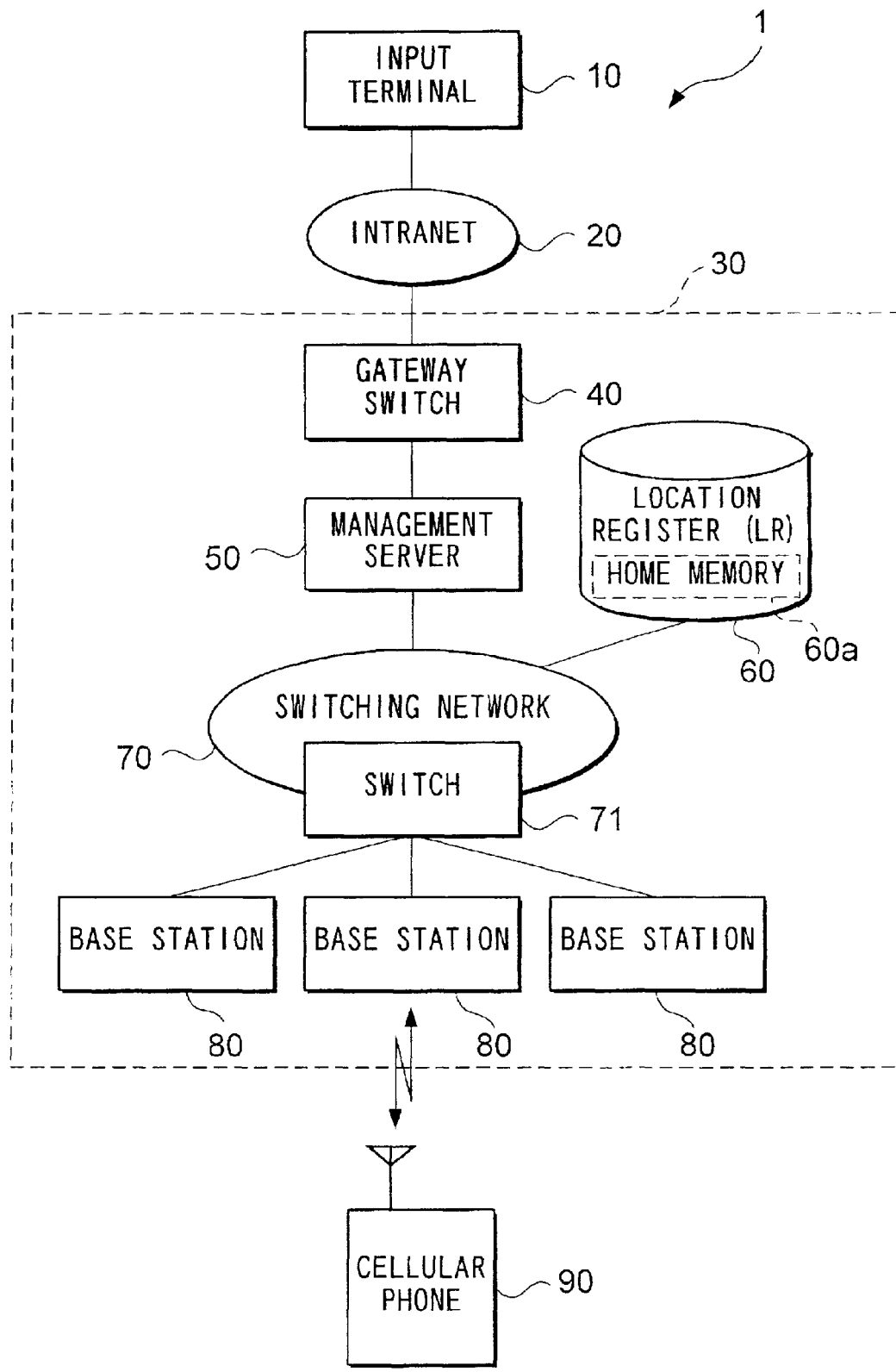
FIG. 1 is a block diagram showing an example configuration of a mobile communication system according to a first embodiment of the present invention.

Embodiments of the present invention will now be described with reference to the drawings. Like elements are denoted by like reference numerals. It is to be noted that the embodiments are mere examples of the present invention, do not limit the invention, and may be modified freely within the scope of the invention.

A. First Embodiment

A-1. Configuration of Embodiment

<1. Configuration of Mobile Communication System>

FIG. 1 is a block diagram showing an example configuration of a mobile communication system 1 according to a first embodiment of the present invention. As shown in FIG. 1, mobile communication system 1 includes a plurality of input terminals 10, an intranet 20, a mobile communication network 30, and a plurality of portable phones such as cellular phones 90 served by mobile communication network 30.

Mobile communication network 30 includes a plurality of gateway switches 40, a management server 50, a location register (hereinafter abbreviated as "LR") 60, a switching network 70 having a plurality of switches 71, and a plurality of base stations 80. Mobile communication network 30 provides voice and packet communication services to each of cellular phones 90 located within the communication service area of mobile communication network 30.

For simplicity, FIG. 1 illustrates only a given input terminal 10, gateway switch 40, switch 71 of switching network 70, base stations 80 connected to switch 71, and a given cellular phone 90 served by the mobile communication network 30.

First, the present embodiment will be described in outline.

In mobile communication system 1, a plurality of section patterns is provided to section a communication service area into a plurality of location areas, such that each location area has a size corresponding to a selected section pattern.

Depending upon usage characteristics (usage patterns) of each cellular phone 90, which can be determined, for example, on the basis of behavior patterns of an owner of cellular phone 90, and frequency of incoming calls, a section pattern is selectable for each cellular phone 90. Once a section pattern is designated for a phone, location registration for that phone is made in mobile communication system 1.

In the present embodiment, an operator of mobile telecommunication services obtains information on probable mobile phone usage of a user of cellular phone 90 when the user enters into a contract with the service operator for a monthly basic charge discount service. Usually, the user will decide, in consultation with the service operator, which predetermined mobile station usage category of characteristics should be selected for use with his/her own cellular phone 90. Selection of an appropriate usage category is made on the basis of information given to the service operator, and will typically include a geographical range of activity, frequently used means of transportation or moving (e.g., train, car, walking), and projected frequency of use (frequency of incoming calls) of cellular phone 90. The selection is made from among a plurality of predetermined mobile station usage categories; and upon choosing a mobile station usage category for cellular phone 90, the user receives a discount on a basic service charge.

By having users select a mobile station usage category, if it is possible to reduce a level of traffic in communication network 30 for cellular phone 90 in relation to location registration and incoming calls, the basic service charge for the phone 90 is discounted according to the agreed-upon provision of the basic charge discount service.

The devices shown in FIG. 1 will now be described.

Input terminal 10 is installed at, for example, a sales shop providing various services for cellular phone 90. At the sales shop, contract information is entered into input terminal 10. This contract information includes a basic charge discount service agreed upon between the service operator and the user. Input terminal 10 transmits the user contract information in the form of packet data to management server 50 within mobile communication network 30 via intranet 20.

User contract information may also include personal information for identifying a user, such as a name, age, and address of a user; and also includes a mobile station usage category number which designates a mobile station usage category of cellular phone 90. If a user is an existing subscriber to a voice communication and/or packet communication service, for example, user contract information may also include subscriber identification information already assigned to the user, such as a telephone number or IP address.

Gateway switch 40 is a switching station which connects intranet 20 with mobile communication network 30. Gateway switch 40 functions to relay data exchanges between intranet 20 and mobile communication network 30, each of which have different communication protocols. This is done by utilizing communication protocol conversion for transmitted data. Upon receipt of packet data of user contract information from input terminal 10 via intranet 20, gateway switch 40 transmits the packet data to management server 50.

Management server 50 manages location registration and basic charge discount services. Management server 50 receives user contract information transmitted from input terminal 10 and manages, for each cellular phone 90, a location area section pattern, used for location registration, corresponding to a mobile station usage category number contained in the user contract information. Further, management server 50 transmits, to a cellular phone 90 signed up to the basic charge discount service, a mobile station usage category number of the phone 90 via switching network 70 and base stations 80.

Moreover, management server 50 transmits to switches 71 of switching network 70 identification information of a location area (i.e., location area ID) comprised of radio areas covered by each of switches 71; with each location area being formed to correspond to a section pattern. Here, each location area is covered by one or a plurality of switches 71. Further, the location area comprised of radio areas covered by switch(es) 71 changes in size and shape, depending on a location area section pattern. Therefore, management server 50 transmits to each switch 71 a plurality of location area IDs corresponding to different location area section patterns.

LR 60 has a home memory 60a. For each cellular phone 90 signed up to the voice communication service and/or the packet communication service provided by mobile communication network 30, LR 60 stores, in home memory 60a, current area information indicating a location area where cellular phone 90 is present, among many location areas which constitute the communication service area, thereby performing location registration.

In the case that a cellular phone 90 utilizes the basic charge discount service, LR 60 stores in home memory 60a, current area information indicating a location area where the cellular phone 90 is present, among location areas which are defined by sectioning the communication service area according to a location area section pattern which corresponds to the mobile station usage category of the cellular phone 90.

LR 60 receives a location registration request transmitted from cellular phone 90 via switching network 70. The location registration request includes a mobile station ID for uniquely specifying a cellular phone 90 having transmitted the request, and a location area ID for uniquely specifying a location area within which the cellular phone 90 is present. LR 60 registers the location area ID in home memory 60*a* while relating it to the mobile station ID. The mobile station ID can be a phone number, IP address, or the like of cellular phone 90. Details of location area ID will be described later.

Switching network 70 is constituted of a plurality of switches 71 connected together. Each switch 71 is connected to one or a plurality of base stations 80. Each of switches 71 performs call connection processing and other processing in response to a call request issued by, or an incoming call request issued to, each cellular phone 90 present within a radio area covered by switch 71; i.e., a radio area covered by a base station(s) 80 connected to switch 71. Further, each switch 71 stores a switch ID for uniquely specifying switch 71 itself.

A large number of base stations 80 are installed within the communication service area of mobile communication network 30; and each base station 80 communicates with a cellular phone(s) 90 located within its own radio area.

Each cellular phone 90 is a mobile station which communicates with base station 80 covering an area within which cellular phone 90 is present, and receives voice communication and/or packet communication services. When cellular phone 90 initially powers on, or when it detects a change in location area, it transmits to base station 80 a signal requesting location registration. Also, if cellular phone 90 when, in an on-state, remains switched on within a single location area it will periodically transmit a location registration request signal to base station 80.

<2. Mobile Station Usage Characteristics and Location Area Section Patterns>

Next, mobile station usage characteristics and location area section patterns will be described. In the present embodiment, as shown in FIG. 2, five categories of mobile station usage characteristics, denoted by numerals "1" to "5", are compiled.

Figure 2:
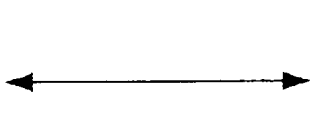
FIG. 2 is a diagram relating to the first embodiment and showing details of usage categories of a mobile station.

As shown in FIG. 2, numeral "1" denotes a mobile station usage category of a cellular phone 90 which remains static, such as one which is installed in a vending machine to obtain goods sales' information; or for a cellular phone 90 which is operated within a limited area. Illustratively, in a case that a user is a student, s/he will typically be at school during the day, and at home at night.

Numeral "2" denotes a mobile station usage category of a cellular phone 90 which is operated within an area of intermediate size, and for which a frequency of incoming calls is high. For example, in a case that the user is a salesperson, s/he will move within a specified locale, and is likely to frequently receive company calls at cellular phone 90.

Numeral "3" denotes a mobile station usage category of a cellular phone 90 which is operated within an area of intermediate size, but for which a frequency of incoming calls is low.

Numeral "4" denotes a mobile station usage category of a cellular phone 90 which is operated within a wide area.

Numeral "5" denotes a mobile station usage category of a cellular phone 90 which is operated within a wide area in specified rapidly moving transportation means, as in the case of a dedicated cellular phone installed in a train, or a cellular phone 90 carried by a person who frequently drives on highways.

As shown in FIG. 2, in mobile communication network 30 the size of one location area changes corresponding to each of the above described mobile station usage categories. Specifically, the higher the usage category number representing that area, the larger the location area.

Next, location area section patterns will be described.

In the present embodiment, five section patterns corresponding to respective mobile station usage categories shown in FIG. 2. are used; with each of the section patterns sectioning the communication service area into a plurality of location areas.

Each of FIGS. 3 to 7 shows a group of location areas obtained by sectioning overlaying communication service areas according to a section pattern for each of the mobile station usage categories. In FIGS. 3 to 7, each hexagon represented by broken lines shows a radio area covered by a single switch 71; i.e., a radio area covered by one or a plurality of base stations 80 connected to a single switch 71. Further, a three-digit number at the center of each hexagon represents a switch ID of switch 71 which covers a corresponding radio area.

Figure 3:
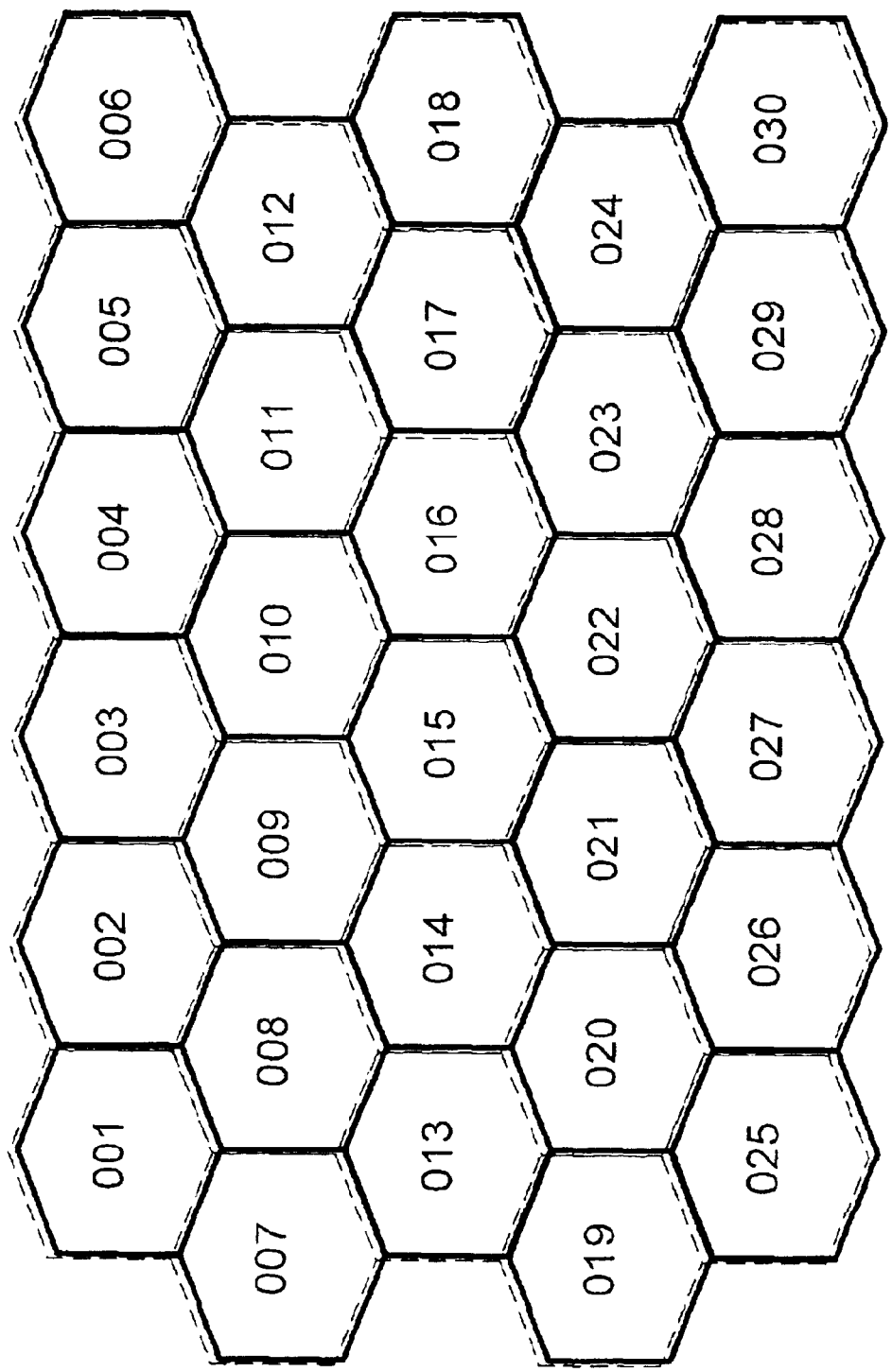
FIG. 3 is a schematic diagram showing an example section pattern of location areas according to the first embodiment, and showing a case where the mobile station usage category number is "1"

In the case that a numeral denoting a mobile station usage category is "1"; i.e., for a cellular phone 90 which remains static or is operated only within a limited area, as shown in FIG. 3, the communication service area is sectioned such that a radio area covered by a single switch 71 serves a single location area. In this case, switch ID of each switch 71 is used as a location area ID.

Figure 4:
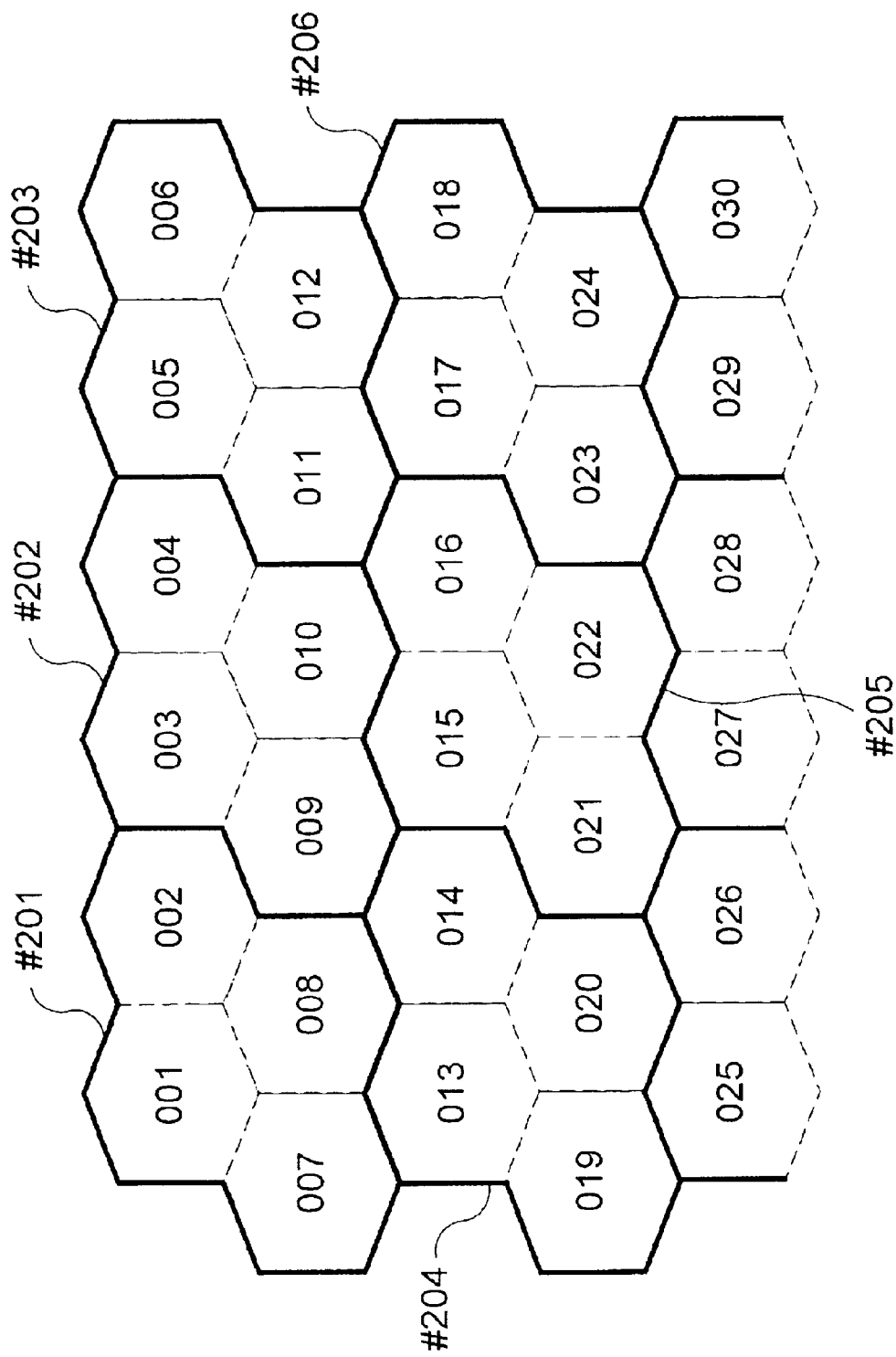
FIG. 4 is a schematic diagram showing an example section pattern of location areas according to the first embodiment, showing a case where the mobile station usage category number is "2"

In the case that a numeral denoting a mobile station usage category is "2"; i.e., for a cellular phone 90 which is operated within an area of intermediate size and for which a frequency of incoming calls is high, as shown in FIG. 4, the communication service area is sectioned such that a radio area covered by four switches 71 serves as a single location area. In this case, for example, a location area ID "#201" is allotted to the radio area covered by four switches, which have switch IDs "001," "002," "007," and "008", respectively.

Figure 5:
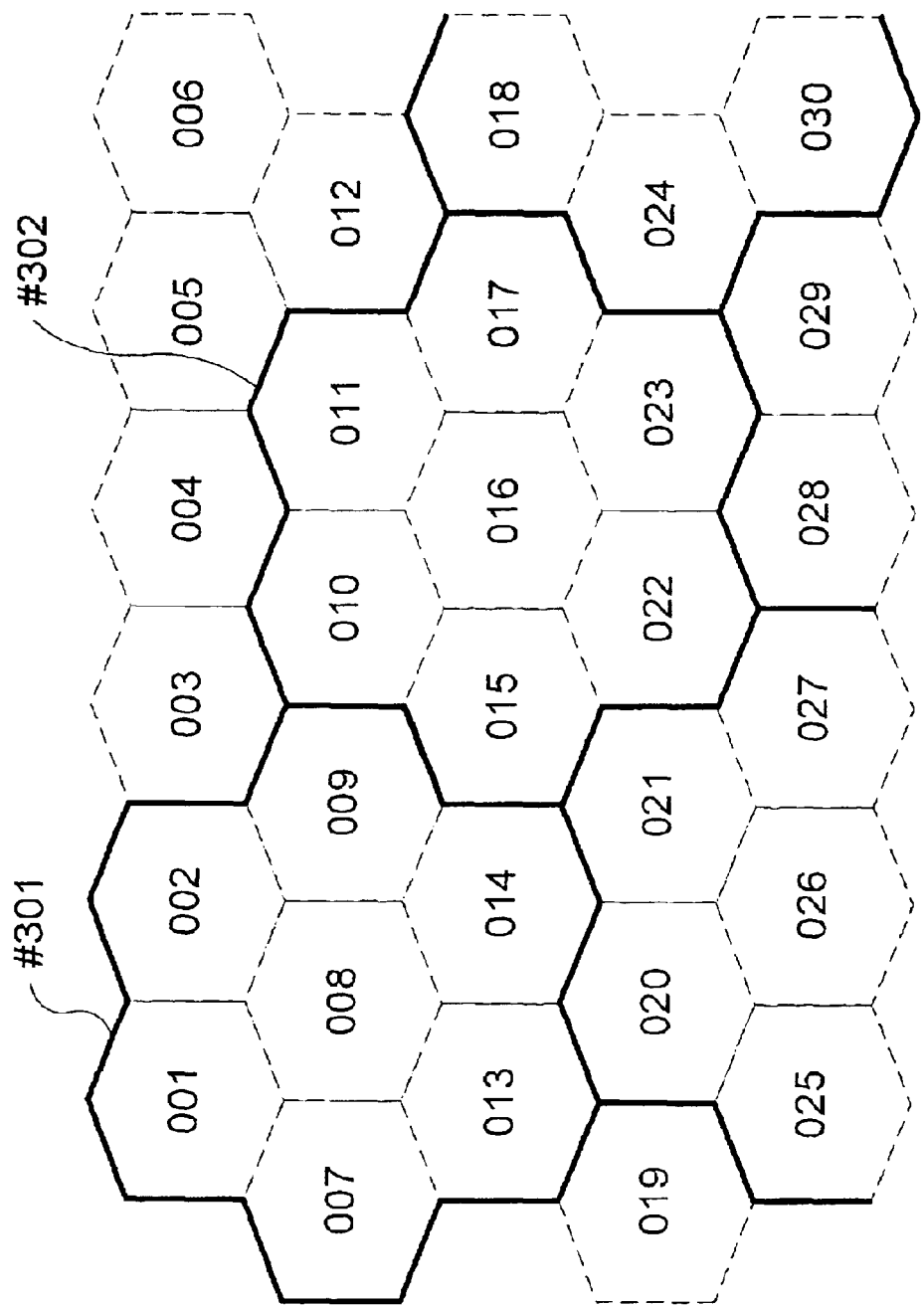
FIG. 5 is a schematic diagram showing an example section pattern of location areas according to the first embodiment, showing a case where the mobile station usage category number is "3"

Similarly, in a case that a numeral denoting a mobile station usage category is "3"; i.e., for a cellular phone 90 which is operated within an area of intermediate size, and for which a frequency of incoming calls is low, as shown in FIG. 5, the communication service area is sectioned such that a radio area covered by seven switches 71 serves as a single location area. Further, different location area IDs are allotted to location areas obtained through such sectioning.

Figure 6:
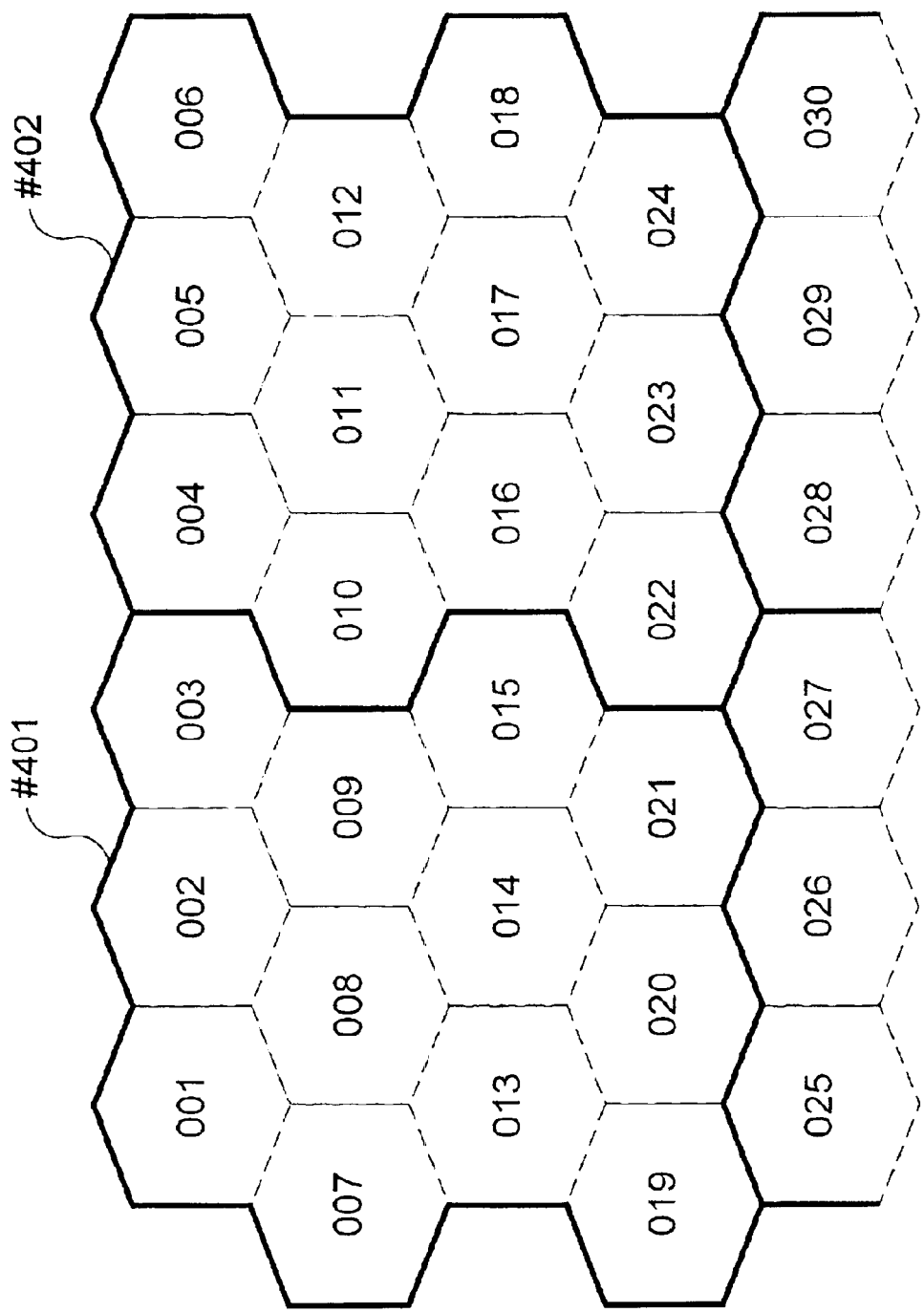
FIG. 6 is a schematic diagram showing an example section pattern of location areas according to the first embodiment, showing a case where the mobile station usage category number is "4"

In the case that a numeral denoting a mobile station usage category is "4"; i.e., for a cellular phone 90 which is operated in a large area, as shown in FIG. 6, the communication service area is sectioned such that a radio area covered by twelve switches 71 serves as a single location area. Further, different location area IDs are allotted to location areas obtained through such sectioning.

Figure 7:
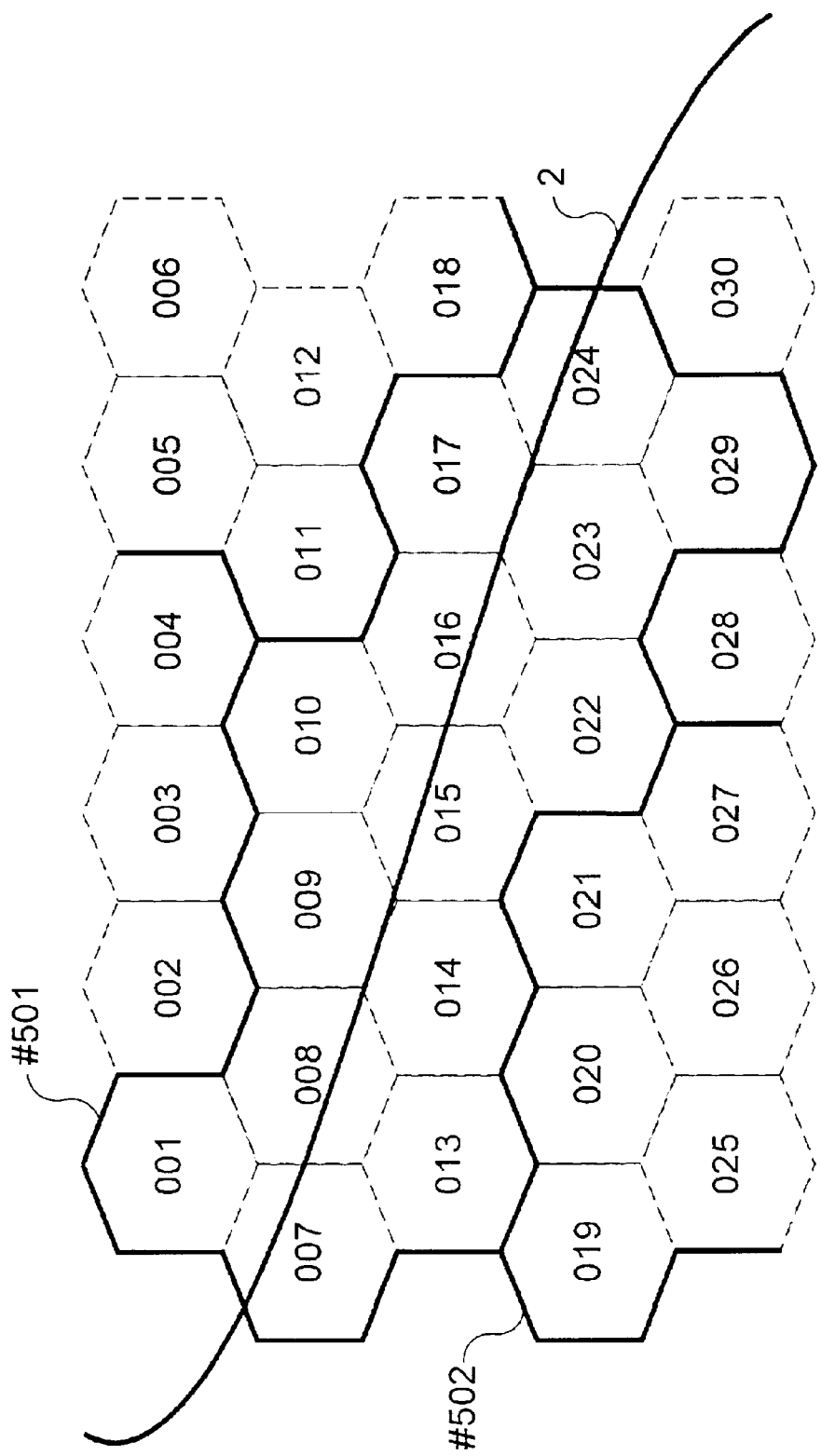
FIG. 7 is a schematic diagram showing an, example section pattern of location areas according to the first embodiment, showing a case where the mobile station usage category number is "5"

In the case where the mobile station usage category number is "5"; i.e., for a cellular phone 90 which is operated within a wide area in specified high speed transportation means, as shown in FIG. 7, the communication service area is sectioned such that a plurality of radio areas along a railroad 2 or a highway serve as a single location area. Further, different location area IDs are allotted to location areas obtained through such sectioning.

As described above, in the mobile communication system 1 according to the present embodiment, location areas available at a time of location registration can be modified in size and shape, responsive to a subject mobile station usage category of cellular phone 90.

<3. Configuration of Management Server>

Next, specific configurations of the respective devices shown in FIG. 1 will be described sequentially.

Figures 8, 9:
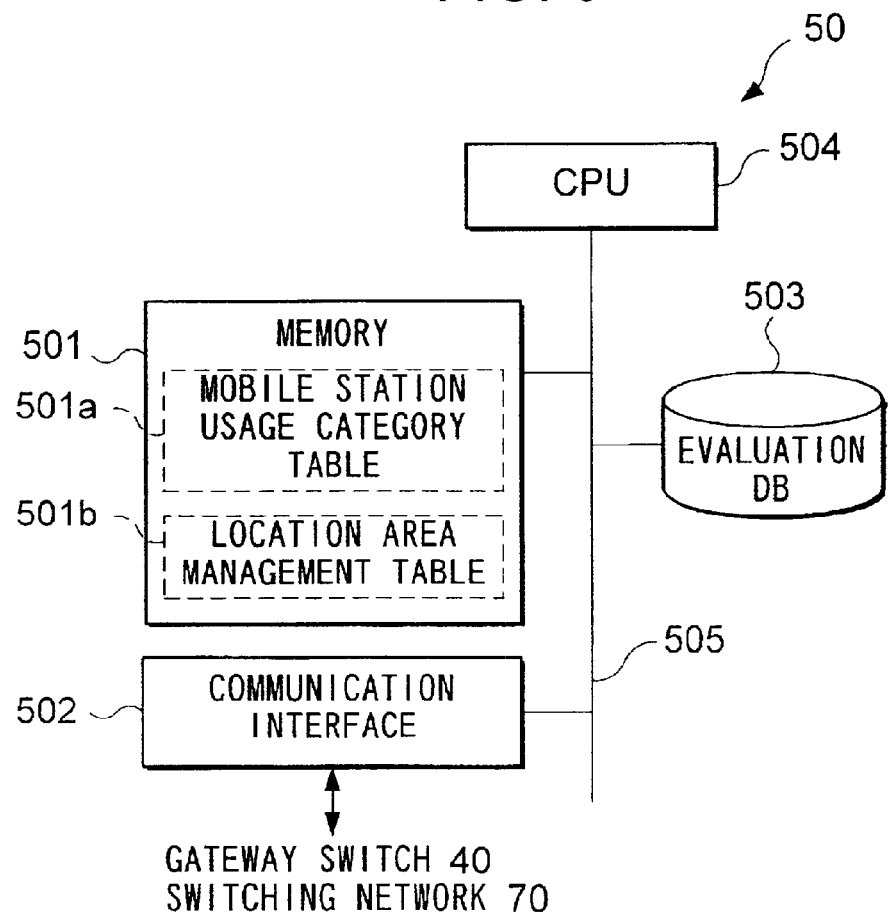
FIG. 8 is a block diagram showing an example hardware configuration of a management server according to the first embodiment.
FIG. 9 is a diagram showing an example data configuration of a mobile station usage category table provided in a memory of the management server according to the first embodiment.

FIG. 8 is a block diagram showing an example hardware configuration of management server 50 shown in FIG. 1. As shown in FIG. 8, management server 50 includes a memory 501, a communication interface 502, an evaluation DB (DataBase) 503, and a CPU (Central Processing Unit) 504, which are mutually connected by a bus 505.

Memory 501 stores various programs to be executed by the CPU 504; and also stores a mobile station usage category table 501a, and a location area management table 501b.

As shown in FIG. 9, in mobile station usage category table 501a, a mobile station usage category number is registered for each of mobile station IDs of cellular phones 90 which are the subject of a contract for use of the basic charge discount service. The mobile station IDs and the mobile station usage category numbers are registered in mobile station usage category table 501a in accordance with user contract information transmitted from input terminal 10. In the example shown in FIG. 9, phone numbers of cellular phones 90 are used as mobile station IDs.

As shown in FIG. 10, location area management table 501b lists, for each mobile station usage category number, data representing the correspondence between a location area ID and a switch ID(s).

As shown in FIG. 10, in the case that a mobile station usage category number is "1," location area sectioning as shown in FIG. 3 is employed; i.e., each switch ID is used as a location area ID. In the case that a mobile station usage category number is "2," location area sectioning as shown in FIG. 4 is employed; i.e., one location area ID is set so as to correspond to four switch IDs. Further, in the case that a mobile station usage category number is "3" or "4," location area sectioning as shown in FIG. 5 or 6 is employed; i.e., one location area ID is set so as to correspond to a plurality of switch IDs of switches which constitute the location area.

In the case that the mobile station usage category number is "5," as shown in FIG. 7, a location area is determined to extend along a railroad 2 or a highway; and one location area ID is set so as to correspond to a plurality of switch IDs of switches which constitute the location area.

Referring again to FIG. 8, communication interface 502 is a circuit for controlling data communications performed between management server 50 and gateway switch 40, and between management server 50 and switches 71, which constitute switching network 70.

For each cellular phone 90 which is the subject of a if contract for use of the basic charge discount service, evaluation data such as a frequency of location registration or incoming calls of cellular phone 90 are stored in evaluation DB 503. Stored evaluation data are used to determine whether a basic service charge is to be discounted, and, if so, to determine a discount rate.

CPU 504 controls, through execution of various programs stored in memory 501, various elements of management server 50 mutually connected via bus 505. CPU 504 executes contract information reception processing (see FIG. 16) and location area ID transmission processing (see FIG. 17), which are particular to the present embodiment and which will be described later.

Further, each month, CPU 504 evaluates location registration frequency and incoming call frequency of each cellular phone 90 using evaluation data stored in evaluation DB 503, and then determines whether a basic service charge is to be discounted and, if so, a discount rate.

<4. Configuration of LR Home Memory>

Figures 11, 12:
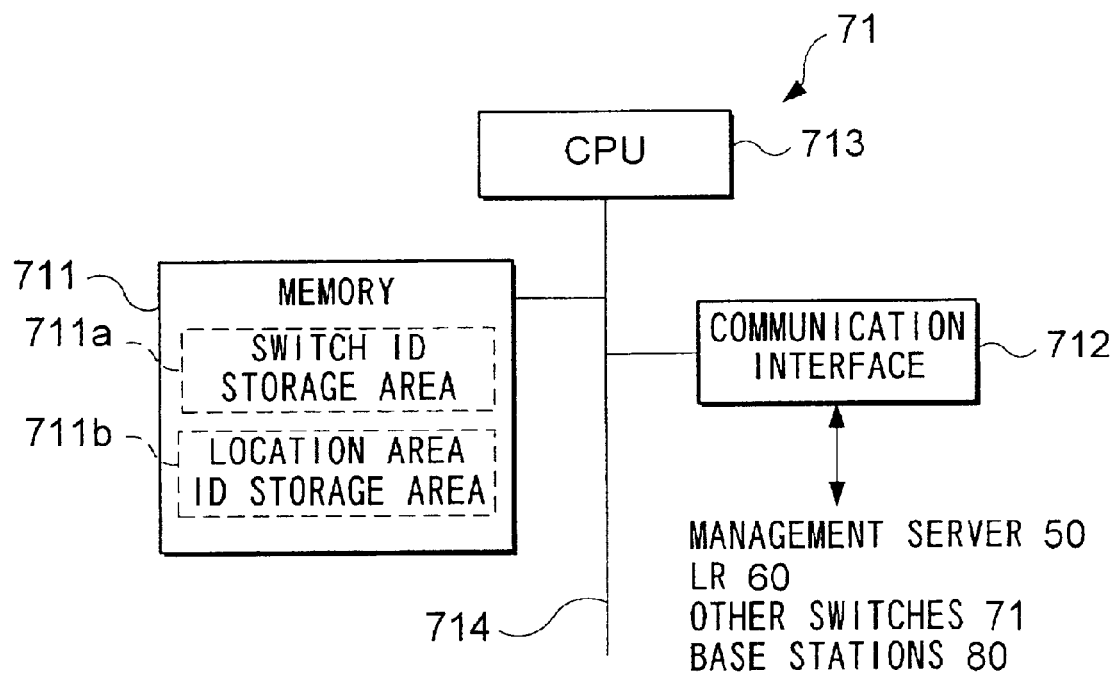
FIG. 11 is a diagram showing items registered in a home memory provided in a location register (LR) according to the first embodiment.
FIG. 12 is a block diagram showing an example hardware configuration of a switch according to the first embodiment.

FIG. 11 is a diagram showing data registered in home memory 60a provided in LR 60. As shown in FIG. 11, for each cellular phone 90 subscribing to a voice communication service and/or packet communication service provided by mobile communication network 30, a location area ID of a At location area within which cellular phone 90 is located is registered in home memory 60a, the location area ID being related to the subject mobile station ID. In the example shown in FIG. 11, a cellular phone 90 having mobile station ID "090-1000-0001" is located within a location area having location area ID "#201"; i.e., any of the radio areas having switch IDs "001," "002," "007," and "008" in the schematic diagram shown in FIG. 4.

<5. Configuration of Switch>

FIG. 12 is a block diagram showing an example hardware configuration of switch 71 shown in FIG. 1. As shown in FIG. 12, switch 71 includes a memory 711, a communication interface 712, and a CPU 713, which are mutually connected by a bus 714.

Memory 711 stores various programs to be executed by CPU 713. Further, memory 711 has a switch ID storage area 711a and a location area ID storage area 711b.

Figures 13A, 13B, 14:
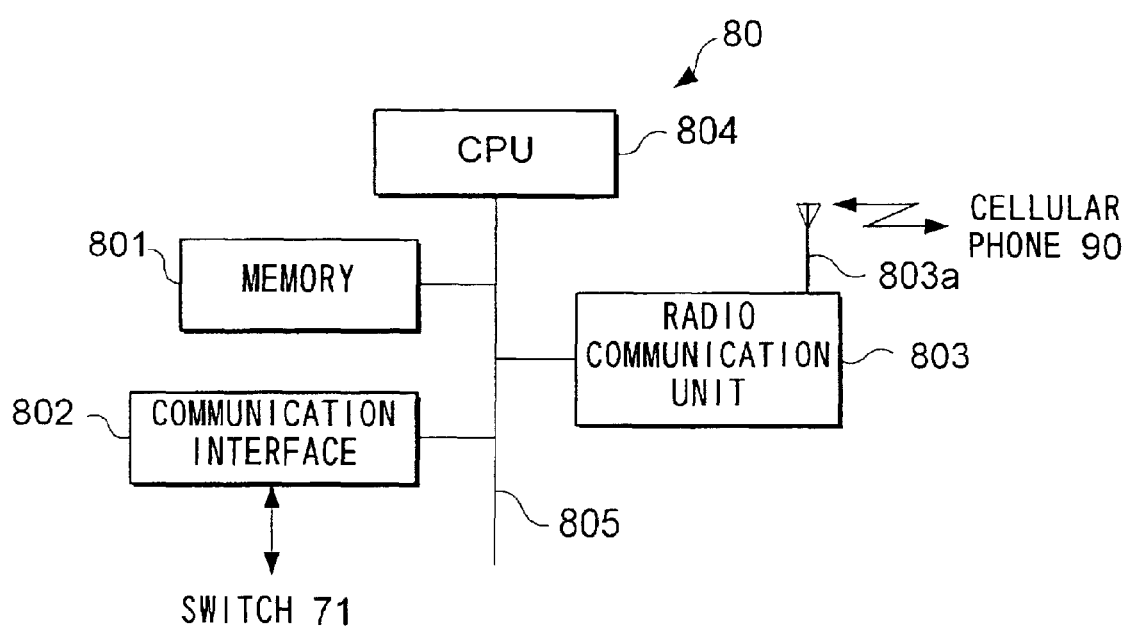
FIG. 13A is a diagram showing an example data configuration of a switch ID storage area provided in a memory of the switch according to the first embodiment.
FIG. 13B is a diagram showing an example data configuration of a location area ID storage area provided in the memory of the switch according to the first embodiment.
FIG. 14 is a block diagram showing an example hardware configuration of a base station according to the first embodiment.

As shown in FIG. 13A, the switch ID of switch 71 is stored in switch ID storage area 711a. This switch ID is used as a location area ID for location registration of a cellular phone 90 having a mobile station usage category number "1."

As shown in FIG. 13B, location area ID storage area 711b stores four location area IDs for mobile station usage category numbers "2" to "5" which have been received from management server 50. Each location area ID serves as information for identifying a location area which includes a radio area covered by switch 71 in each location area section pattern, and is used for location registration of a cellular phone 90 having a mobile station usage category number of "2" to "5."

Communication interface 712 is a circuit for controlling data communication between switch 71, and management server 50, LR 60, and other switches 71, or base stations 80.

CPU 713 controls various elements of switch 71 through execution of various programs stored in memory 711, the various elements being mutually connected by bus 714. CPU 713 transmits to each of base stations 80 connected to switch 71 the total of five location area IDS, each of which corresponds to mobile station usage category numbers "1" to "5", stored in switch ID storage area 711a and location area ID storage area 711b. This processing is particular to the present embodiment. Further, CPU 713 redirects to LR 60 a location registration request signal transmitted from cellular phone 90 via base station 80.

<6. Configuration of Base Station>

FIG. 14 is a block diagram showing an example hardware configuration of base station 80 shown in FIG. 1. As shown in FIG. 14, base station 80 includes a memory 801, a communication interface 802, a radio communication unit 803, and a CPU 804, which are mutually connected by a bus 805.

Memory 801 stores various programs to be executed by CPU 804, and other data. Further, memory 801 is used as a work area in which, for example, five location area IDs for mobile station usage category numbers "1" to "5" received from switch 71 and other data are temporarily stored.

Communication interface 802 is a circuit for controlling data communication performed between base station 80 and switch 71.

Radio communication unit 803 is equipped with an antenna 803a and controls radio data communication at performed with each cellular phone 90. Under control of CPU 804, radio communication unit 803 generates a control signal which includes five location area IDs for mobile station usage category numbers "1" to "5" received from switch 71, and other data. The control signal is a radio signal which is transmitted intermittently between base station 80 and cellular phone 90 using a control channel (CCH), and is used for transmission and reception of data, such as information and various control signals, including those for location registration, between mobile communication network 30 and each cellular phone 90. Further, radio communication unit 803 generates a radio signal for transmitting packet data or voice data for voice communication. Radio communication unit 803 transmits the thus-generated signals to cellular phone 90 via antenna 803a.

Moreover, radio communication unit 803 receives via antenna 803a a control signal transmitted from cellular phone 90 and demodulates the control signal to thereby obtain a location registration request signal and other signals. Further, radio communication unit 803 receives a radio signal containing packet data or voice data for voice communication, and demodulates the received data to thereby obtain packet data or voice data.

CPU 804 controls various elements of base station 80 mutually connected by bus 805, through execution of various programs stored in memory 801. CPU 804 executes control signal transmission processing (see FIG. 18) and control signal reception processing (see FIG. 20), which are particular to the present embodiment, to thereby exchange control signals with cellular phone 90 via radio communication unit 803.

<7. Configuration of Cellular Phone>

Figure 15:
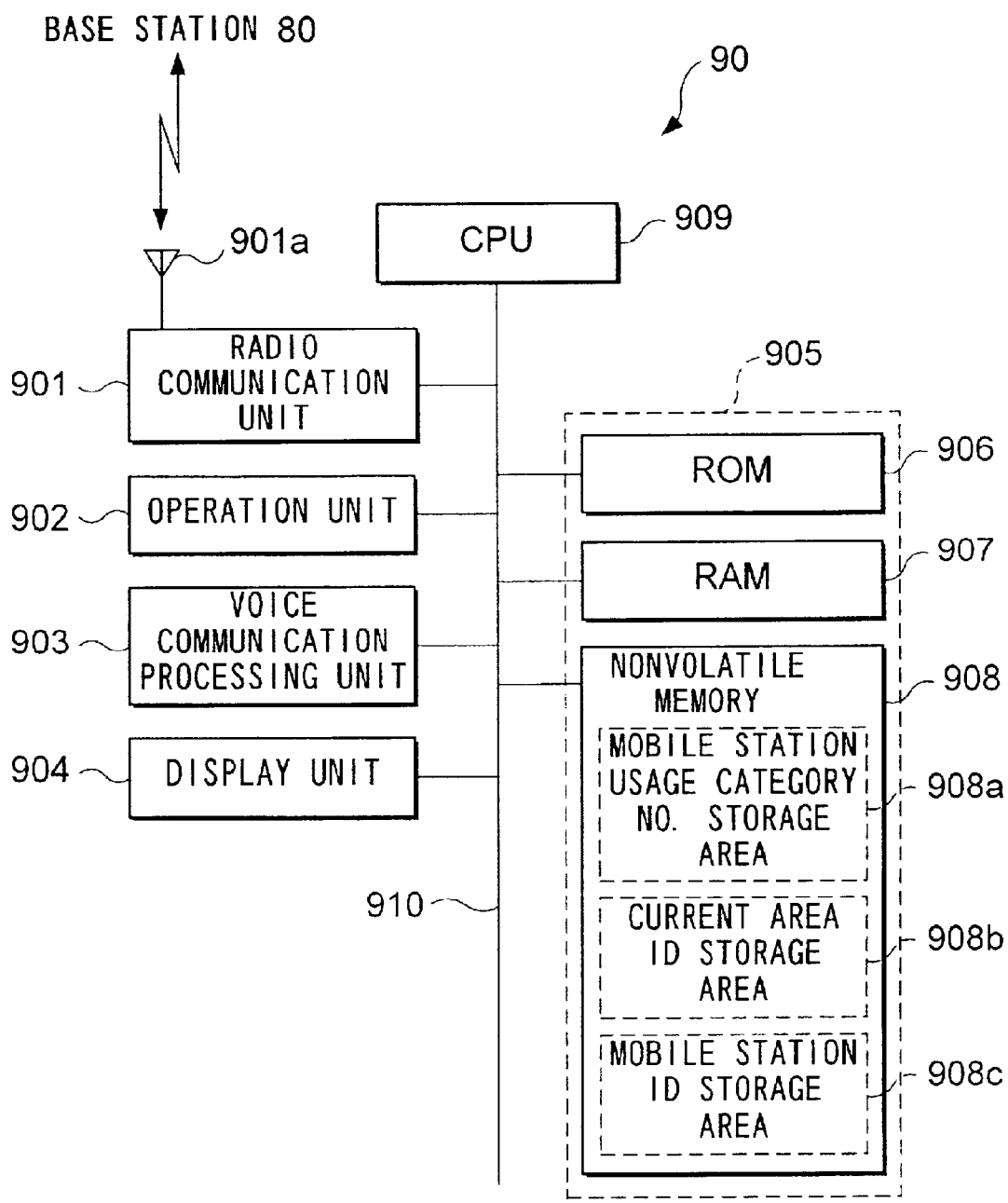
FIG. 15 is a block diagram showing an example hardware configuration of a cellular phone according to the first embodiment.

FIG. 15 is a block diagram showing an example hardware configuration of cellular phone 90 shown in FIG. 1. As shown in FIG. 15, cellular phone 90 includes a radio communication unit 901, an operation unit 902, a voice communication processing unit 903, a display unit 904, a storage unit 905, and a CPU 909, which are mutually connected by a bus 910.

Radio communication unit 901 is equipped with an antenna 901a and controls radio data communication performed with base station 80. Under control of CPU 909, radio communication unit 901 generates a control signal including a location registration request signal. Further, radio communication unit 901 generates a radio signal for transmitting packet data or voice data for voice communication. Radio communication unit 901 transmits the thus-generated signals to base station 80 via antenna 901a.

Moreover, radio communication unit 901 receives via antenna 901a a control signal transmitted from base station CD 80, and demodulates the control signal to obtain five location area IDs for mobile station usage category numbers "1" to "5", and other information. Further, radio communication unit 901 receives a radio signal containing packet data or voice data for voice communication, and demodulates the received data to obtain voice data or packet data.

Operation unit 902 is equipped with a plurality of keys for inputting numerals, letters, and operation commands, and in accordance with operation of these keys outputs operation signals to CPU 909. Voice communication processing unit 903 includes a microphone, a speaker, a voice processing section, etc., and under the control of CPU 909, performs voice communication processing, including call connection/ disconnection processing. Display unit 904 includes a liquid crystal display panel and a drive circuit for controlling a display operation of the liquid crystal display panel.

Storage unit 905 includes ROM (Read Only Memory) 906, RAM (Random Access Memory) 907, and nonvolatile memory 908 such as SRAM (Static RAM) or EEPROM (Electrically Erasable Programmable Read Only Memory).

Various programs to be executed by CPU 909 and other data are stored in ROM 906. RAM 907 is used as a work area of CPU 909 in which five location area IDs for mobile station usage category numbers "1" to "5" received from base station 80 and other data are temporarily stored.

Nonvolatile memory 908 includes a mobile station usage category number storage area 908a, a current area ID storage area 908b, and a mobile station ID storage area 908c.

The mobile station usage category number of cellular phone 90 received from base station 80 is stored in mobile station usage category number storage area 908a. The location area ID of a location area within which cellular phone 90 is present is stored in current area ID storage area 908b. The mobile station ID of cellular phone 90 is written in mobile station ID storage area 908c at the time of, for example, purchase of cellular phone 90.

CPU 909 controls various elements of cellular phone 90 mutually connected by bus 910, through execution of various programs stored in storage unit 905. CPU 909 executes location registration processing (see FIG. 19), which is particular to the present embodiment, to transmit a control signal including a location registration request signal from radio communication unit 901 to base station 80 when, for example, cellular phone 90 is operated in another location area.

The configuration of mobile communication system 1 according to the present embodiment has been described above.

A-2. Operation of Embodiment

Next, operation of each of the devices in mobile communication system 1 in carrying out various processings of the present embodiment will be described.

<1. Contract Operation>

First, to receive the basic charge discount service, a user signs a contract at a sales shop. In contracting use of the service, the user provides the service operator with information for use in deciding on a mobile station usage category for cellular phone 90.

Such information includes a home range of the user, frequently used means of transportation or moving (e.g., train, car, walking), and an expected frequency of incoming calls to cellular phone 90.

Once a category is decided, a person working at the shop inputs, into input terminal 10, user contract information in relation to the basic charge discount service, which information includes a mobile station usage category number designating the usage category chosen. Input terminal 10 converts the user contract information to packet data and transmits the data to management server 50 of mobile communication network 30 via intranet 20.

Figure 16:
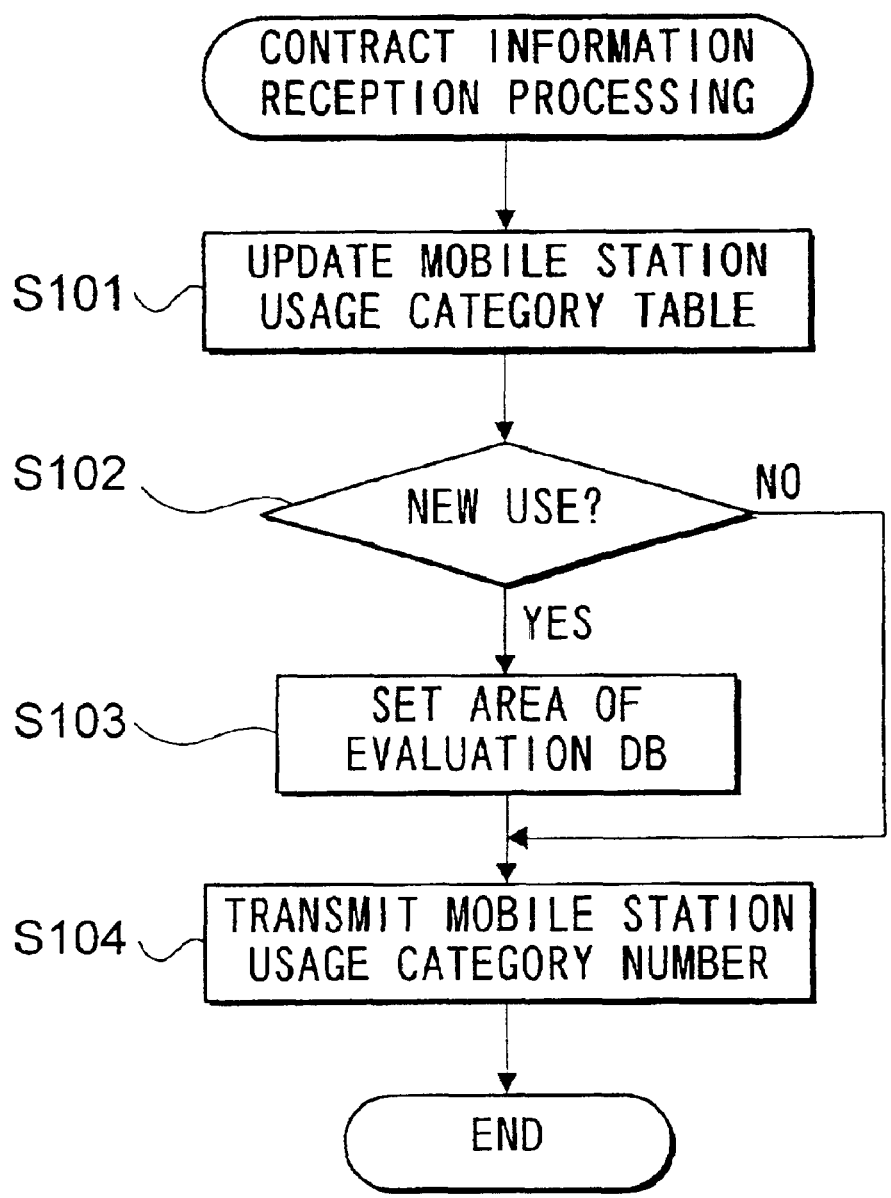
FIG. 16 is a flowchart showing contract information reception processing performed by the CPU of the management server according to the first embodiment.

Management server 50, upon receipt of the user contract information, starts contract information reception processing, as shown in FIG. 16.

As shown in FIG. 16, CPU 504 of management server 50 first updates mobile station usage category table 501a provided in memory 501 in accordance with received user contract information (step S101). That is, on the basis of the user contract information, CPU 504 stores the mobile station usage category number of cellular phone 90 in mobile station usage category table 501a for cellular phone 90 which is the subject of a new contract entered into for using the basic charge discount service, or for which contract details have been changed. In this way, the mobile station usage category number is related to the mobile station ID of each cellular phone 90.

Subsequently, CPU 504 determines whether cellular phone 90 for which the mobile station usage category number storing processing has been performed in the above described step S101 is a new user of the service (step S102).

When cellular phone 90 is not a new user, CPU 504 proceeds to step S104. When cellular phone 90 is determined to be a new user of the service, CPU 504 sets within evaluation DB 503 a memory area for storing evaluation data of cellular phone 90 (step S103). As described, evaluation data are required in determining whether the basic service charge is to be discounted, and, if so, to determine a discount rate.

Subsequently, CPU 504 transmits the mobile station usage category number, via switching network 70 and base station 80, to cellular phone 90 for which a contract for using the basic charge discount service has been placed or the cellular phone 90 for which the contents of a contract have been changed (step S104), and ends the contract information reception processing.

When cellular phone 90 receives the mobile station usage category number from base station 80 which covers a radio area within which cellular phone 90 is located, cellular phone 90 stores the mobile station usage category number in mobile station usage category number storage area 908a of nonvolatile memory 908.

<2. Operation in Transmitting Changed Location Area ID>

As in the foregoing description, switch 71 has, in memory 711, location area ID storage area 711b in which location area IDs for each of the mobile station usage category numbers "2" to "5" are stored. In the case that, for example, there is any modification in definitions of boundaries of location area section patterns, it becomes necessary to transmit changed location IDs from management server 50 to switch 71.

Figure 17:
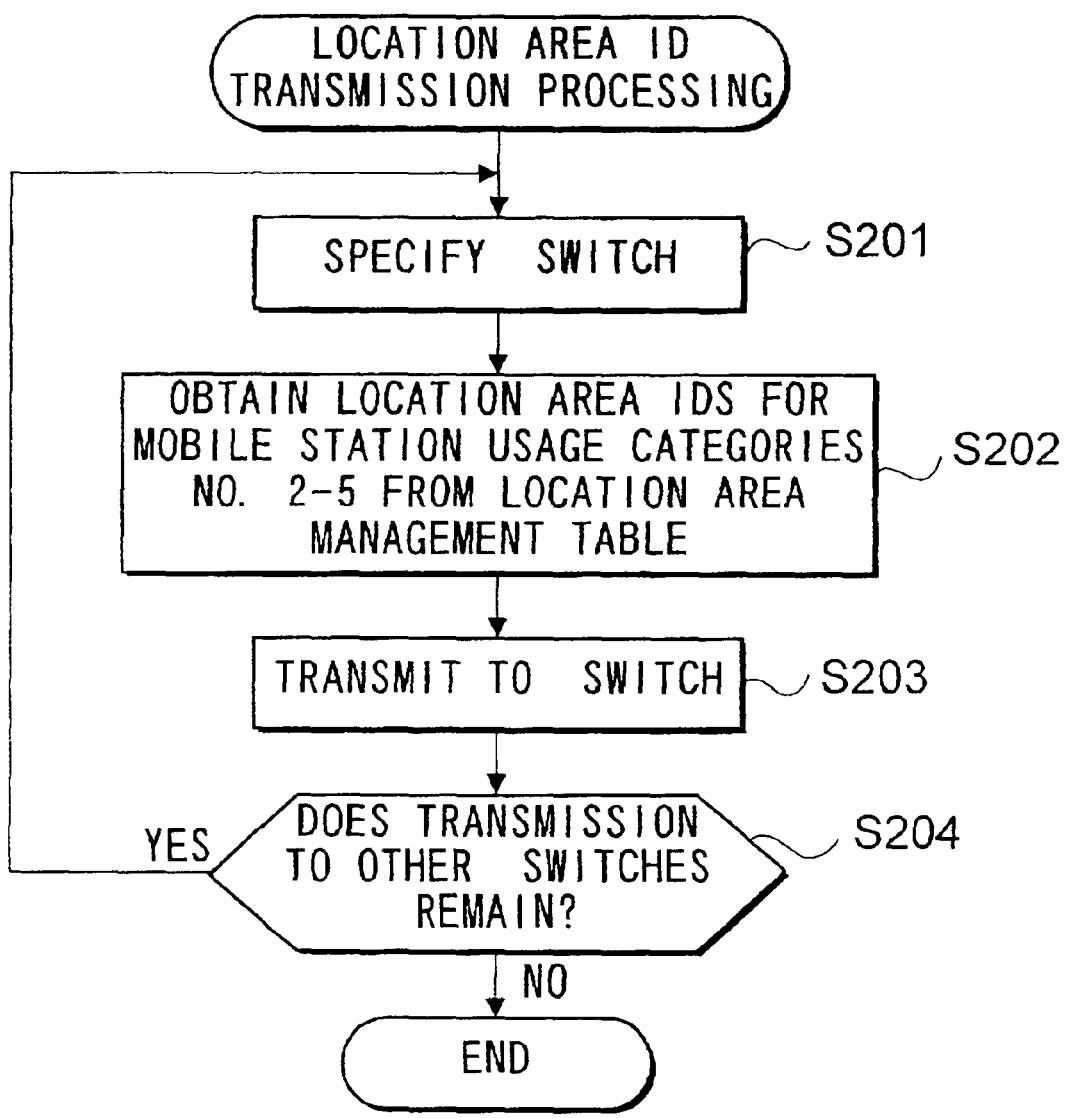
FIG. 17 is a flowchart showing location area ID transmission processing performed by the CPU of the management server according to the first embodiment.

FIG. 17 is a flowchart showing location area ID transmission processing performed by CPU 504 of the management server 50. CPU 504 starts the location area ID transmission processing when the section pattern of local areas is changed or when a request for transmission of location area IDS is received from switch 71.

As shown in FIG. 17, CPU 504 first specifies switch 71 to which location area IDs are to be transmitted (step S201). Subsequently, while referring to location area management table 501b of memory 501 in accordance with the switch ID of the specified switch 71, CPU 504 obtains four location area IDs for mobile station usage category numbers "2" to "5" for the radio area covered by the specified switch 71 (step S202). The switch ID of switch 71 itself is used as a location area ID for the mobile station usage category number "1", so that CPU 504 does not have to obtain an ID therefor.

Then, CPU 504 transmits the obtained four location area IDs via communication interface 502 to the switch 71 specified in the above described step S201 (step S203).

Subsequently, CPU 504 determines whether the location area ID transmission processing must be performed for other switches 71 (step S204). When CPU 504 determines that the location area ID transmission processing must be performed for other switches 71, CPU 504 returns to the above described step S201. When CPU 504 determines that the location area ID transmission processing has been performed for all the relevant switches 71, CPU 504 ends the location area ID transmission processing.

When each of the relevant switches 71 receives the four location area IDs for mobile station usage category numbers "2" to "5" from management server 50, each switch 71 stores these location area IDS in its location area ID storage area 711b provided within memory 711. Further, each switch 71 transmits, via communication interface 712, a location area ID for mobile station usage category number "1" to "5" stored in switch ID storage area 711a and location area IDs for mobile station usage category numbers "2" to "5" stored in location area ID storage area 711b to each of base stations 80 connected to switch 71.

Figure 18:
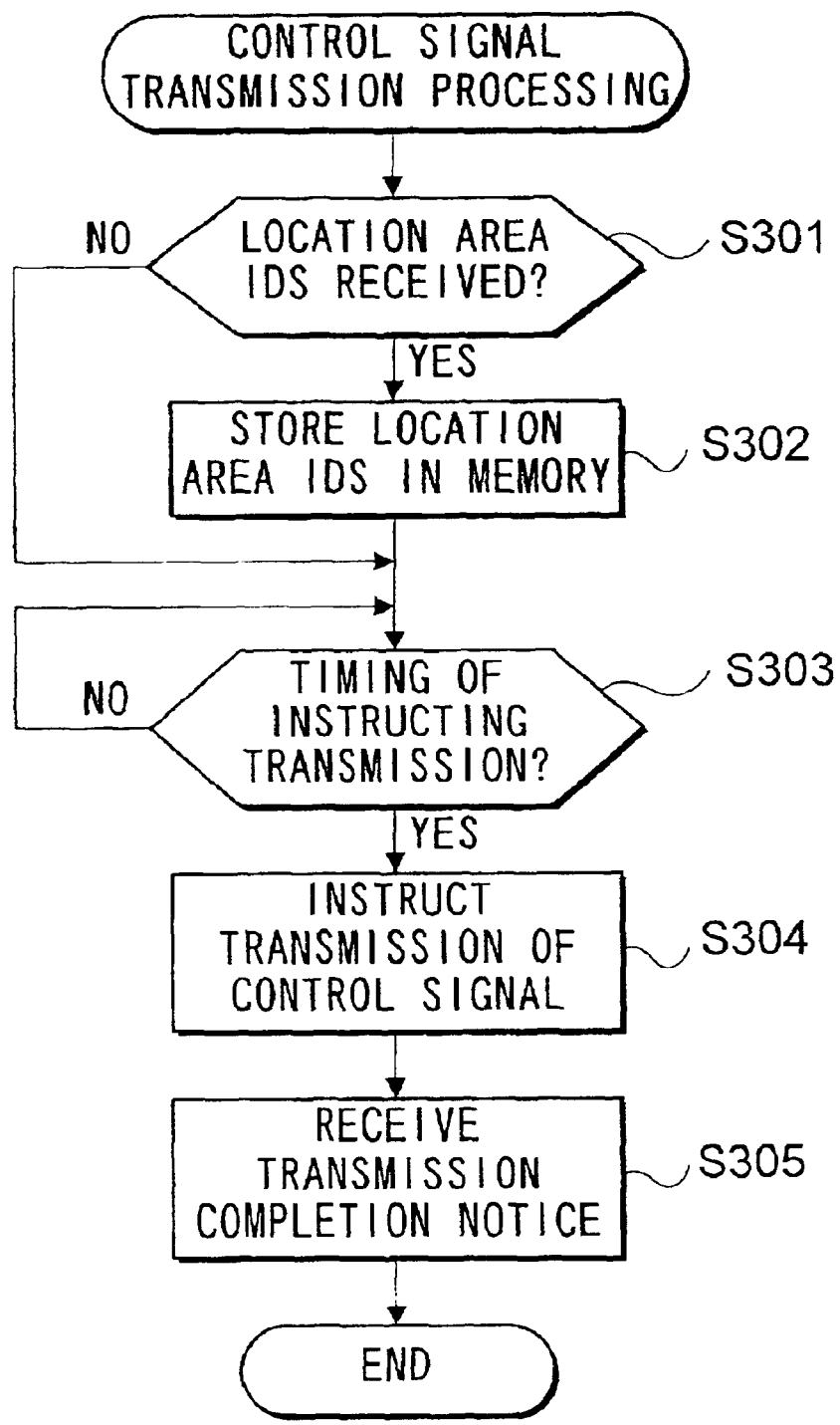
FIG. 18 is a flowchart showing control signal transmission processing performed by the CPU of the base station according to the first embodiment.

Base stations 80 receive location area IDS for each of the mobile station usage category numbers "1" to "5" transmitted from switch 71, and store them in memory 801 (step S302 of FIG. 18).

<3. Operation in Transmitting Control Signal>

Base station 80 intermittently transmits, on control channel to each cellular phone 90 located in its radio area, the five location area IDS stored in memory 801.

FIG. 18 is a flowchart showing control signal transmission processing performed by CPU 804 of base station 80. CPU 804 starts the control signal transmission processing periodically by means of, for example, timer interruption.

As shown in FIG. 18, CPU 804 first checks whether CPU 804 has received the five location area IDs for mobile station usage category numbers "1" to "5" from switch 71 (step S301). When CPU 804 has not received the location area IDs, CPU 804 proceeds to Step S303. When CPU 804 has received the location area IDs, CPU 804 stores the IDS in memory 801 (step S302).

Subsequently, CPU 804 determines whether a timing for instructing the transmission of a control signal has come (step S303). The timing for instructing the transmission of a control signal is determined in consideration of a timing of sending out a control signal which is intermittently sent out and a time period required for generation of the control signal. When CPU 804 determines that the timing for instructing the transmission of a control signal has come, CPU 804 reads the location area IDs for mobile station usage category numbers "1" to "5" from memory 801 and transmits them to radio communication unit 803 together with a command for instructing the transmission of a control signal (step S304).

In response, radio communication unit 803 first generates a control signal including, as broadcast information, the location area IDs for mobile station usage category numbers "1" to "5" transmitted from CPU 804. The broadcast information refers to information contained in a broadcasting channel (BCCH) in the control channel; the broadcasting channel is a uni-directional channel used for W broadcasting control information from base station 80 to each cellular phone 90.

Via antenna 803a, radio communication unit 803 transmits the generated control signal to cellular phones located in the corresponding radio area. Subsequently, radio communication unit 803 transmits to CPU 804 a transmission completion notice indicating completion of transmission of the control signal. Upon reception of the transmission completion notice from radio communication unit 803 (step S305), CPU 804 ends the control signal transmission processing.

<4. Operation in Registering Location>

Cellular phone 90, upon reception of a control signal from base station 80, carries out a location registration processing for registering its own location in the network.

Figure 19:
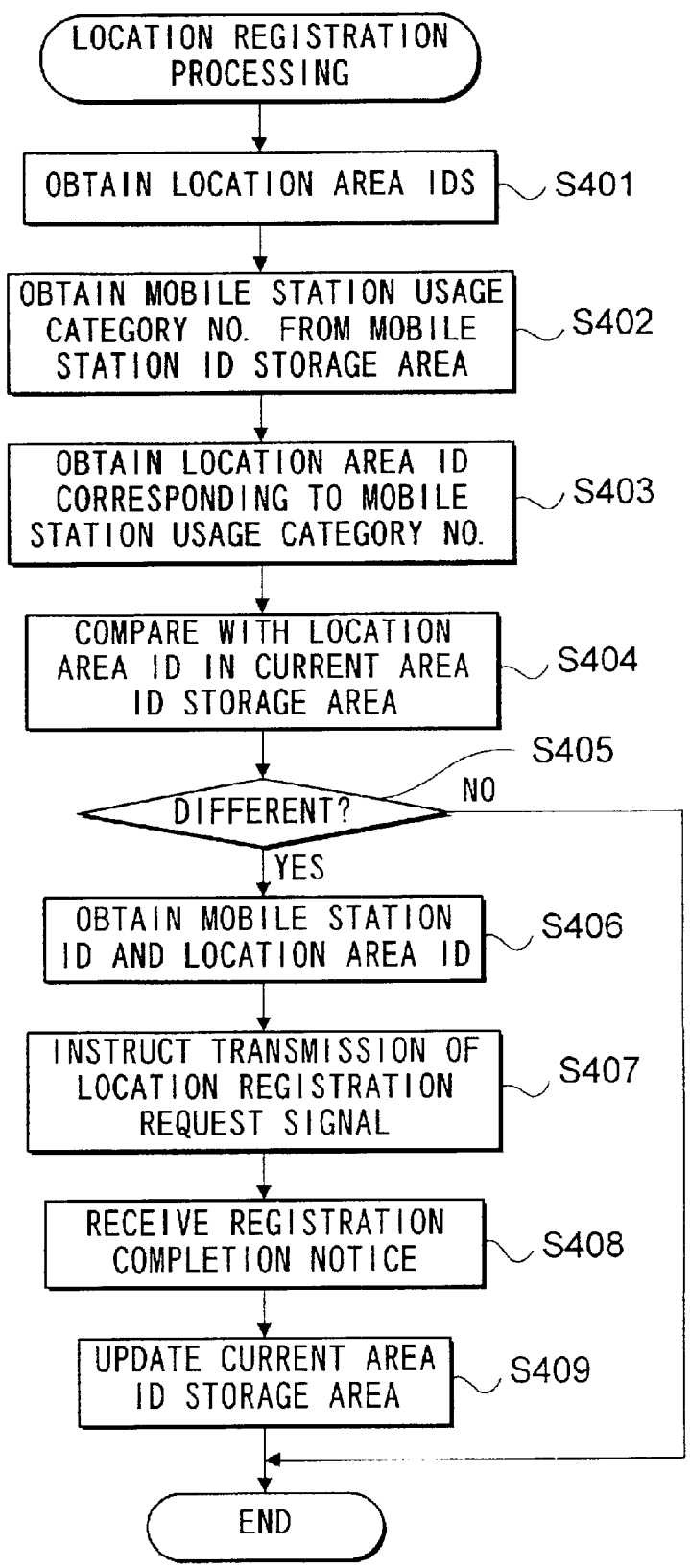
FIG. 19 is a flowchart showing location registration processing performed by the CPU of the cellular phone according to the first embodiment.

FIG. 19 is a flowchart showing location registration processing performed by CPU 909 of cellular phone 90. CPU 909 starts the location registration processing upon intermittent receipt of a control signal from base station 80.

As shown in FIG. 19, CPU 909 first obtains the location area IDs for mobile station usage category numbers "1" to "5" contained in the control signal demodulated in radio communication unit 901 (step S401). CPU 909 then stores the location area IDs in RAM 907. Subsequently, CPU DO 909 obtains a mobile station usage category number from mobile station usage category number storage area 908a (step S402). Then, CPU 909 obtains a location area ID corresponding to the mobile station usage category number of cellular phone 90, among the location area IDS stored in RAM 907 (step S403).

Subsequently, CPU 909 compares the obtained location area ID and the location area ID stored in current area ID storage area 908b (step S404). On the basis of the comparison result, CPU 909 determines whether the location area IDs are different from each other (step S405).

When CPU 909 determines that the location area IDs are the same (step S405: No); i.e., when CPU 909 determines that cellular phone 90 has continuously remained within the same location area, CPU 909 ends the location registration processing.

When CPU 909 determines that the location area IDs are different (step S405: Yes); i.e., when CPU 909 determines that cellular phone 90 has moved to a different location area, CPU 909 reads the mobile station ID of cellular phone 90 from mobile station ID storage area 908c and obtains the location area ID specified in the above described step S403 (step S406). Subsequently, CPU 909 transmits to radio communication unit 901 the mobile station ID, the location area ID, and a command for instructing transmission of a location registration request signal (step S407).

In response thereto, radio communication unit 901 generates a control signal which includes, as separate cell information, the location registration request signal containing the received mobile station ID and location area ID. The separate cell information refers to information contained in a separate cell channel (SCCH) in the control channel. Further, the separate cell channel is a bi-directional channel used for exchanging control information between base stations 80 and cellular phones 90.

Radio communication unit 901 then transmits the generated control signal to base station 80 via antenna 901a. The control signal containing the location registration request signal is received by base station 80, and the location registration request signal contained in the control signal is transmitted from base station 80 to LR 60 via switch 71. When the current area information of cellular phone 90 is updated in accordance with the received location registration request signal in LR 60, a registration completion notice is returned from LR 60 to base station 80 via switch 71. Base station 80 incorporates the registration completion notice into a control signal and transmits it to cellular phone 90 which has originally issued the location registration request. The details will be described later in relation to control signal reception processing (see FIG. 20) performed at base station 80.

Upon reception of the registration completion notice via radio communication unit 901 (step S408), CPU 909 of cellular phone 90 replaces the location area ID stored in current area ID storage area 908b with the location area ID specified in the above described step S403 (step S409), and then ends the location registration processing.

The location registration processing is performed also when CPU 909 of cellular phone 90 detects that the power of cellular phone 90 has been turned on. That is, when cellular phone 90 is turned on, CPU 909 selects a location area ID corresponding to its own mobile station usage category number among the location area IDS contained in control signal transmitted from base station 80 and transmits to base station 80 a location registration request signal including the selected location area ID and its own mobile station ID.

<5. Operation in Receiving Control Signal>

Base station 80 intermittently receives control signals transmitted from each cellular phone 90.

Figure 20:
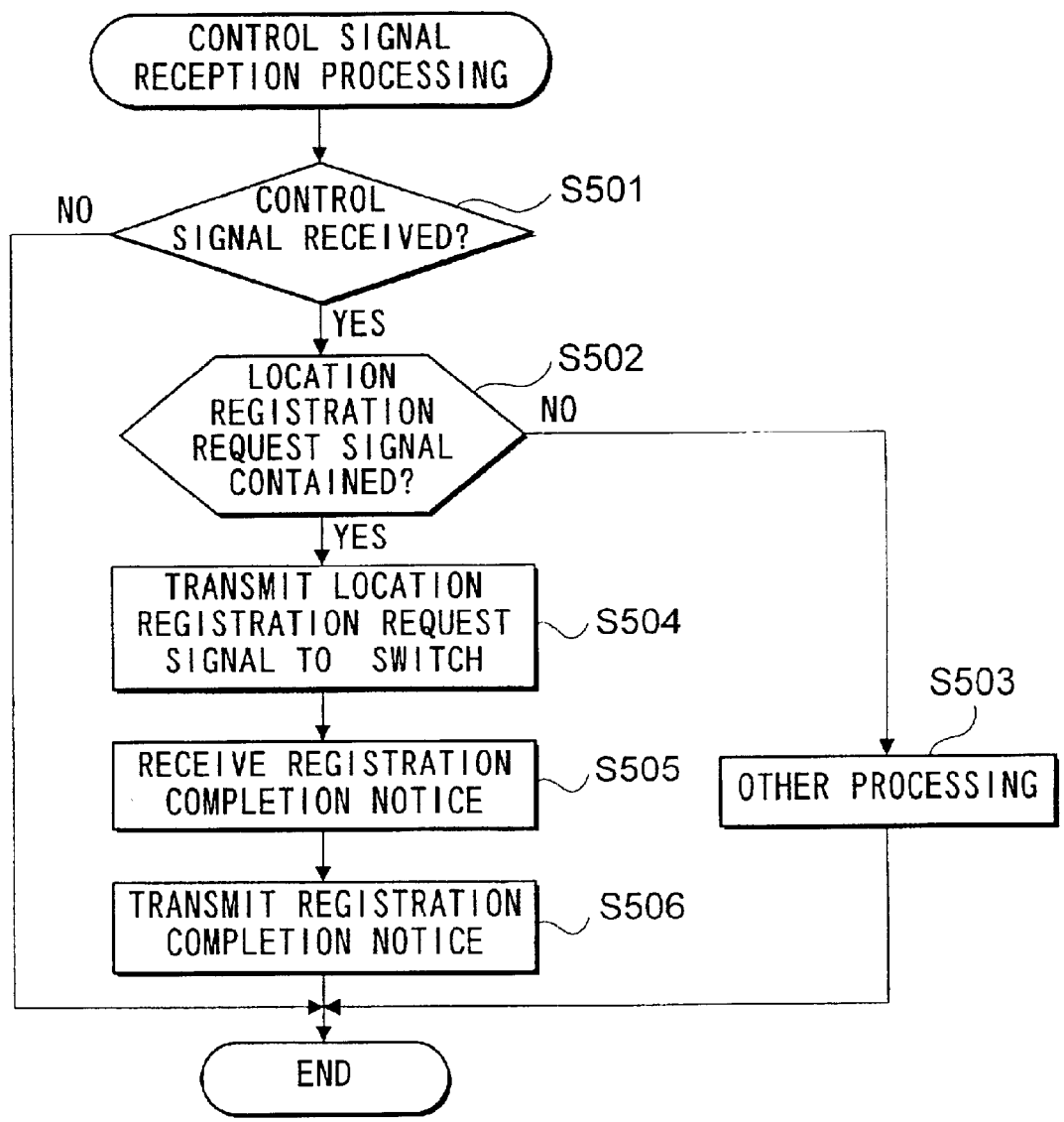
FIG. 20 is a flowchart showing control signal reception processing performed by the CPU of the base station according to the first embodiment.

FIG. 20 is a flowchart showing control signal reception processing performed by CPU 804 of base station 80. CPU 804 starts the control signal reception processing periodically by means of, for example, timer interruption.

As shown in FIG. 20, CPU 804 first determines whether radio communication unit 803 has received a control signal from a cellular phone 90 (step S501). When no control signal has been received, CPU 804 ends the control signal reception processing.

When CPU 804 determines that radio communication unit 803 has received a control signal, CPU 804 determines whether the control signal demodulated in radio communication unit 803 includes a location registration request signal (step S502). When CPU 804 determines that no location registration request signal is included, CPU 804 performs other processing in relation to reception of the control signal (step S503), and then ends the control signal reception processing.

When CPU 804 determines that the control signal received and demodulated by radio communication unit 803 includes a location registration request signal, CPU 804 transmits the location registration request signal, including a mobile station ID and a location area ID, to switch 71 via communication interface 802 (step S504).

Upon reception of the location registration request signal from base station 80, switch 71 transmits the location registration request signal to LR 60. In response thereto, LR 60 updates the current area information of the cellular phone 90 stored in home memory 60a, in accordance with the mobile station ID and the location area ID included in the location registration request signal. Subsequently, LR 60 transmits to base station 80 a registration completion notice indicating completion of the requested location registration.

Upon receipt of the registration completion notice from LR 60 via switch 71 (step S505), CPU 804 of base station 80 transmits a control signal including the registration completion notice to the cellular phone 90 for which location registration has been performed, via radio communication unit 803 (step S506). Subsequently, CPU. 804 ends the control signal reception processing.

<6. Operation in Incoming Call>

Figure 21:
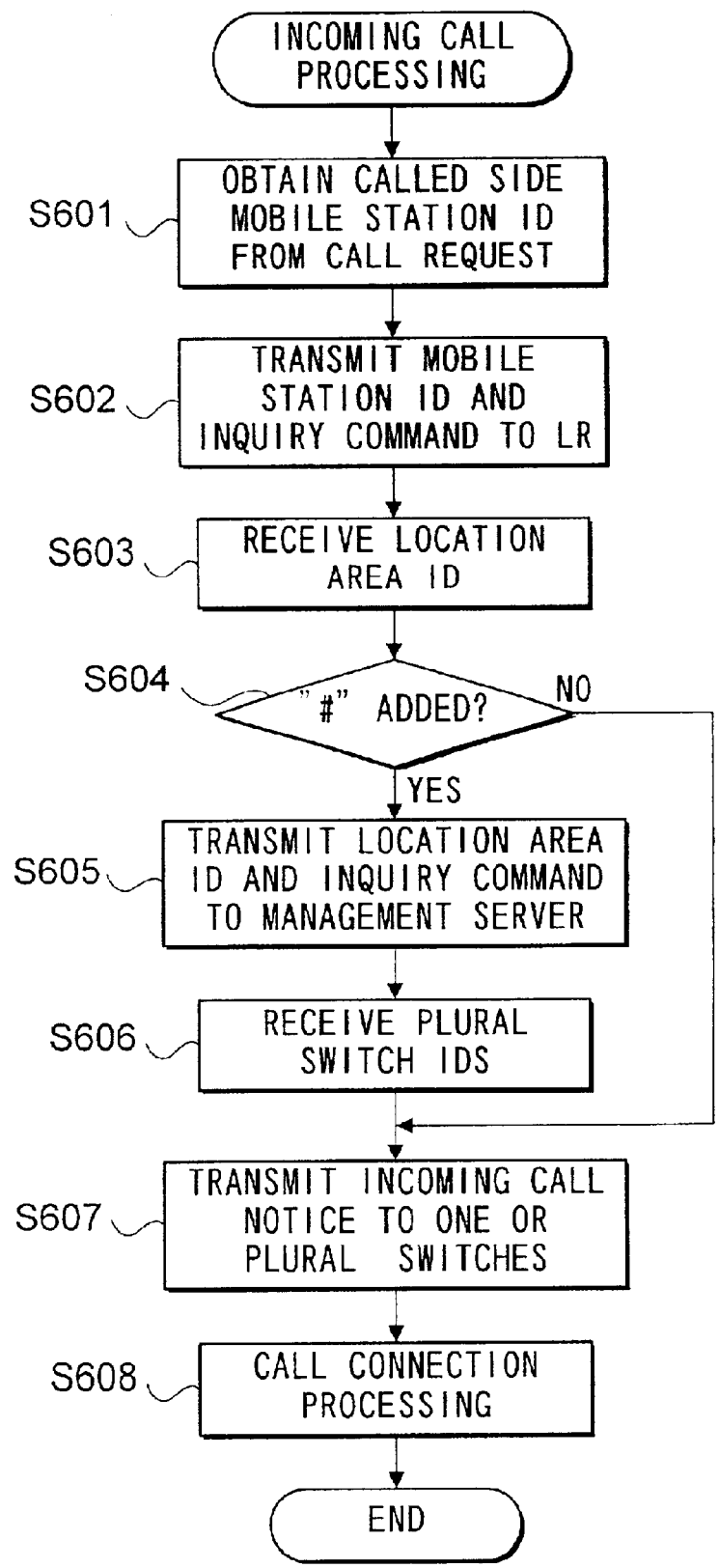
FIG. 21 is a flowchart showing incoming call processing performed by the CPU of the switch according to the first embodiment.

FIG. 21 is a flowchart showing incoming call processing performed by CPU 713 of switch 71. CPU 713 starts the incoming call processing in response to a call request from a cellular phone 90 present in a radio area covered by switch 71, when a called cellular phone 90 is served by mobile communication network 30.

As shown in FIG. 21, CPU 713 first obtains a mobile station ID of the called cellular phone 90 (a called side mobile station ID), which is included in the call request received via communication interface 712 (step S601). Subsequently, CPU 713 transmits to LR 60 the called side mobile station ID and a command for inquiring the current location area of a cellular phone 90 having the called side mobile station ID (step S602).

Upon reception of the mobile station ID and the inquiry command from switch 71, LR 60 reads a location area ID corresponding to the mobile station ID from home memory 60a and returns it to switch 71 having performed the inquiry.

Switch 71 receives the location area ID which has been sent from LR 60 in response to the inquiry (step S603). Thus, switch 71 can specify the location area in which the called cellular phone 90 is located. Subsequently, CPU 713 of switch 71 determines whether "#" has been added to the beginning of the received location ID (step S604). When CPU 713 determines that "#" has not been added; i.e., that the received location area ID is a switch ID, CPU 713 proceeds to the above described step S607.

When CPU 713 determines that Ago has been added to the beginning of the received location ID; i.e., that the received location area ID is one of the location area IDs for mobile station usage category numbers "2" to "5," CPU 713 transmits to management server 50 the location area ID and a command for inquiring switch IDs corresponding to the location area ID (step S605).

Upon reception of the location area ID and the inquiry command from switch 71, management server 50 reads out of location area management table 501b a plurality of switch IDs corresponding to the location area ID and returns them to switch 71 having performed the inquiry.

In response thereto, CPU 713 of switch 71 receives the plurality of switch IDs from management server 50 (step S606). Subsequently, in accordance with the plurality of switch IDs received in the above described step S606 or the single switch ID which has been determined in the above described step S604 by virtue of "#" not having been added thereto, CPU 713 transmits an incoming call notice including the called side mobile station ID to one or a plurality of corresponding switches 71; i.e., to the switch or switches 71 which cover the location area within which the called cellular phone 90 is present (step S607).

Upon reception of the incoming call notice, the one or plurality of switches 71 call the called cellular phone 90 via base station(s) 80 connected to the switch(es) 71. In response thereto, the called cellular phone 90 returns a call accepted signal. Subsequently, the switch 71 having received the call accepted signal and the calling side switch 71 perform call connection processing (step S608). Subsequently, CPU 713 of the calling side switch 71 ends the incoming call processing.

<7. Supplementary Description of Other Operations>

CPU 504 of management server 50, at predetermined intervals, such as every month, evaluates location registration frequency and incoming call frequency of each cellular phone 90 while using the evaluation data stored in evaluation DB 503, and then determines whether a basic service charge is to be discounted and, if so, the discount rate. Subsequently, for each cellular phone 90, CPU 504 transmits to a charge management server (not shown) of mobile communication network 30 information regarding whether discount is to be applied and, if so, a discount rate.

In accordance with the received information, the charge management server determines a monthly basic service charge for a user receiving the basic charge discount service. Further, for each subscriber of the voice communication service and/or the packet communication service, the charge management server calculates a monthly service use fee in accordance with the usage of the respective services, and adds the basic service charge to the service use fee to thereby determine a monthly charge for each subscriber.

A-3. Effects of Embodiment

As in the foregoing description, according to the present embodiment, for cellular phone 90 using the basic charge discount service, location registration is performed in accordance with a location area section pattern corresponding to the mobile station usage category of cellular phone 90. Therefore, for a cellular phone 90 which moves at high speed within a wide area, location registration is performed by use of a large location area corresponding to the mobile station usage category of the cellular phone 90. For a cellular phone 90 which moves at high speed within a wide area due to use of transportation means such as a train or a highway, location registration is performed by use of a large location area formed along the railroad 2 or a highway.

Accordingly, frequent transmission of a location registration request signal from cellular phone 90 can be suppressed, and thus the power consumption of cellular phone 90 can be reduced. Further, in mobile communication network 30, useless traffic in relation to location registration can be eliminated at the radio transmission line between base station 80 and cellular phone 90 and at the transmission line extending from base station 80 to switch 71 and further to LR 60.

Moreover, according to the present embodiment, when there is an incoming call directed to a cellular phone 90 using the basic charge discount service, a location area in which the cellular phone 90 is present is determined in accordance with the same location area section pattern corresponding to a mobile station usage category of the cellular phone 90 as used at the time of location registration, and switches 71, through base stations 80 within the location area, call the cellular phone 90 simultaneously.

Accordingly, a cellular phone 90 whose movement area is small and whose incoming call frequency is high is called simultaneously, through base stations 80, by switches 71 within a small location area corresponding to the mobile station usage category of the cellular phone 90. In other words, simultaneous transmission of useless paging signals from base stations 80 can be suppressed to a minimum.

B. Second Embodiment

In the above described first embodiment, five location area IDS for mobile station usage category numbers "1" to "5" are transmitted from mobile communication network 30 to each cellular phone 90. In the present embodiment, only switch IDs are transmitted from mobile communication network 30 to each cellular phone 90.

The mobile communication system according to the present embodiment is the same in configuration as that shown in FIG. 1. Therefore, unless otherwise specified, the respective devices used in the present embodiment have the same configurations and operate in the same manner as those of the first embodiment. In the present embodiment, elements identical to those of the first embodiment are denoted by the same reference numerals. Further, for sections identical to those of the first embodiment, repeated description is omitted.

B-1. Configuration of Embodiment

Figure 22:
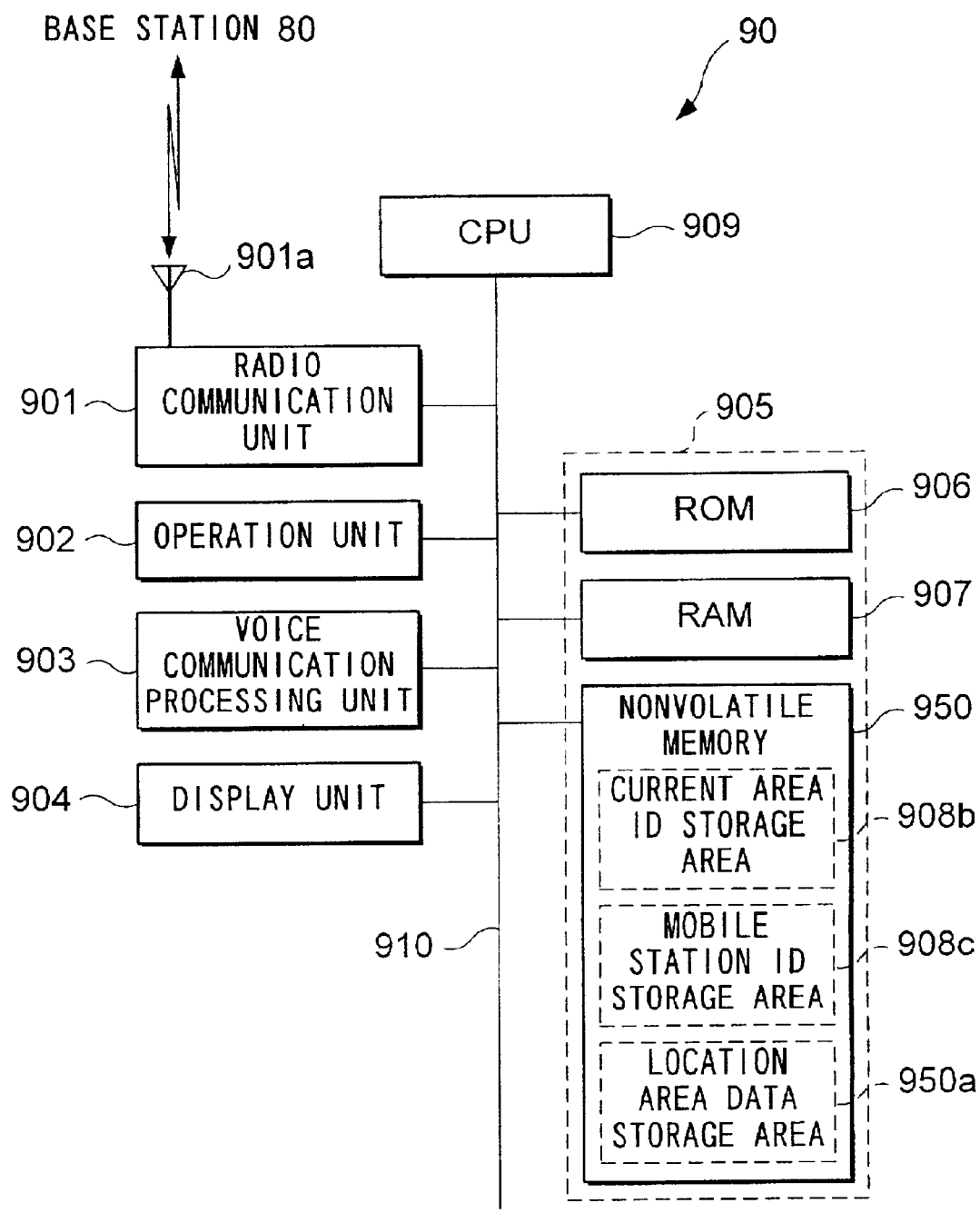
FIG. 22 is a block diagram showing an example hardware configuration of a cellular phone according to a second embodiment of the present invention.

Cellular phone 90 in the present embodiment subscribes to the packet communication service and can perform packet communication with management server 50. Cellular phone 90 has a hardware configuration as shown in FIG. 22. As shown in the figure, cellular phone 90 has a nonvolatile memory 950, which has current area ID storage area 908b and mobile station ID storage area 908c, described in the first embodiment, and a location area data storage area 950a.

Figure 23:
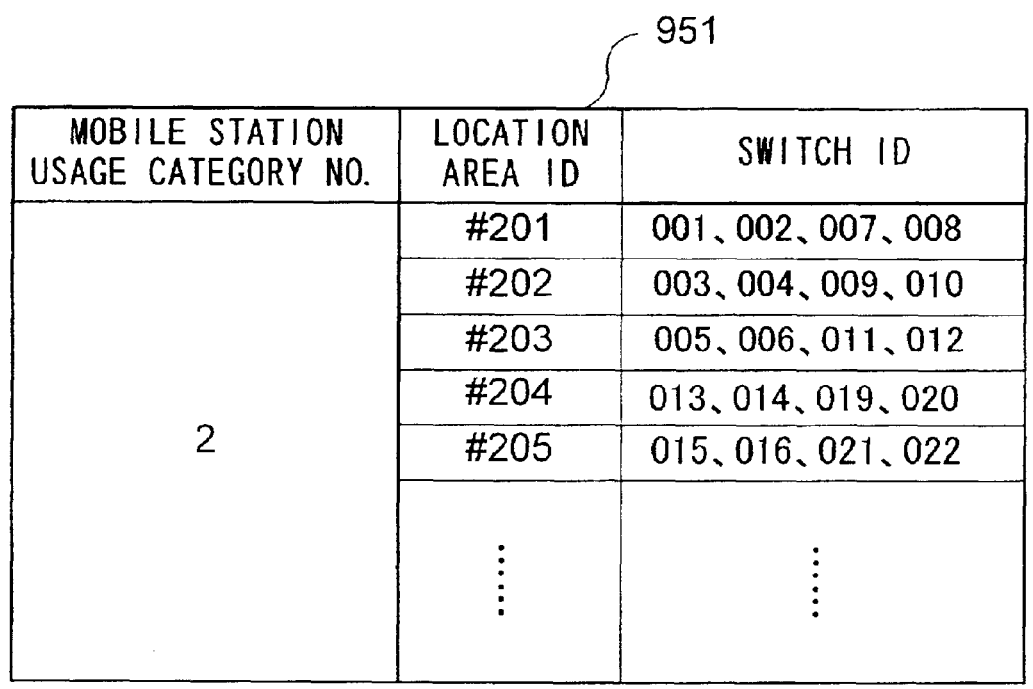
FIG. 23 is a diagram showing an example data configuration of a location area table stored in a location area data storage area in the cellular phone according to the second embodiment.

As shown in FIG. 23, location area data storage area 950a stores table data (a location area table 951) corresponding to a portion of location area management table 501b (see FIG. 10) stored in memory 501 of management server 50, the portion corresponding to a mobile station usage category number set for cellular phone 90. Location area table 951 stores data representing the correspondence between location area IDs and switch IDs set for the mobile, station characteristic number of cellular phone 90.

Location area table 951 contains data transmitted from management server 50. Management server 50 stores in advance, in its memory 501, a location area table 951 for each mobile station usage category number as data to be transmitted to cellular phone 90.

FIG. 23 exemplifies a location area table 951 prepared for the case in which the mobile station usage category number of cellular phone 90 is "2."

It should be also noted that, in the present embodiment, location area storage area 711b of each switch 71 in the first embodiment is no more required.

B-2. Operation of Embodiment

Operation of the present embodiment will be described.

First, in step S104 of the above described contract information reception processing (see FIG. 16), management server 50 transmits, to cellular phone 90 for which a contract for using the basic charge discount service has been placed or a cellular phone 90 for which the contents of a contract have been changed, location area table 951 corresponding to the mobile station usage category number of cellular phone 90, via switching network 70 and base station 80 (step S104).

The processing in step S104 will be described more in details. First, packet communication is performed between management server 50 and cellular phone 90; cellular phone 90 transmits to management server 50 a download request for downloading location area table 951 corresponding to its own mobile station usage category number. Upon reception of the download request, management server 50 refers to mobile station usage category table 501a, reads location area table 951 corresponding to the mobile station usage category number of cellular phone 90 out of memory 501, and transmits it to cellular phone 90.

Upon reception of location area table 951, cellular phone 90 stores location area table 951 in location area data storage area 950a.

In the present embodiment, management server 50 is not required to perform the location area ID transmission processing (see FIG. 17). Each switch 71 transmits only its own switch ID to each of base stations 80 connected to switch 71. Base stations 80 transmit to cellular phone 90 a control signal which includes the switch ID received from switch 71.

<1. Operation in Registering Location>

Figure 24:
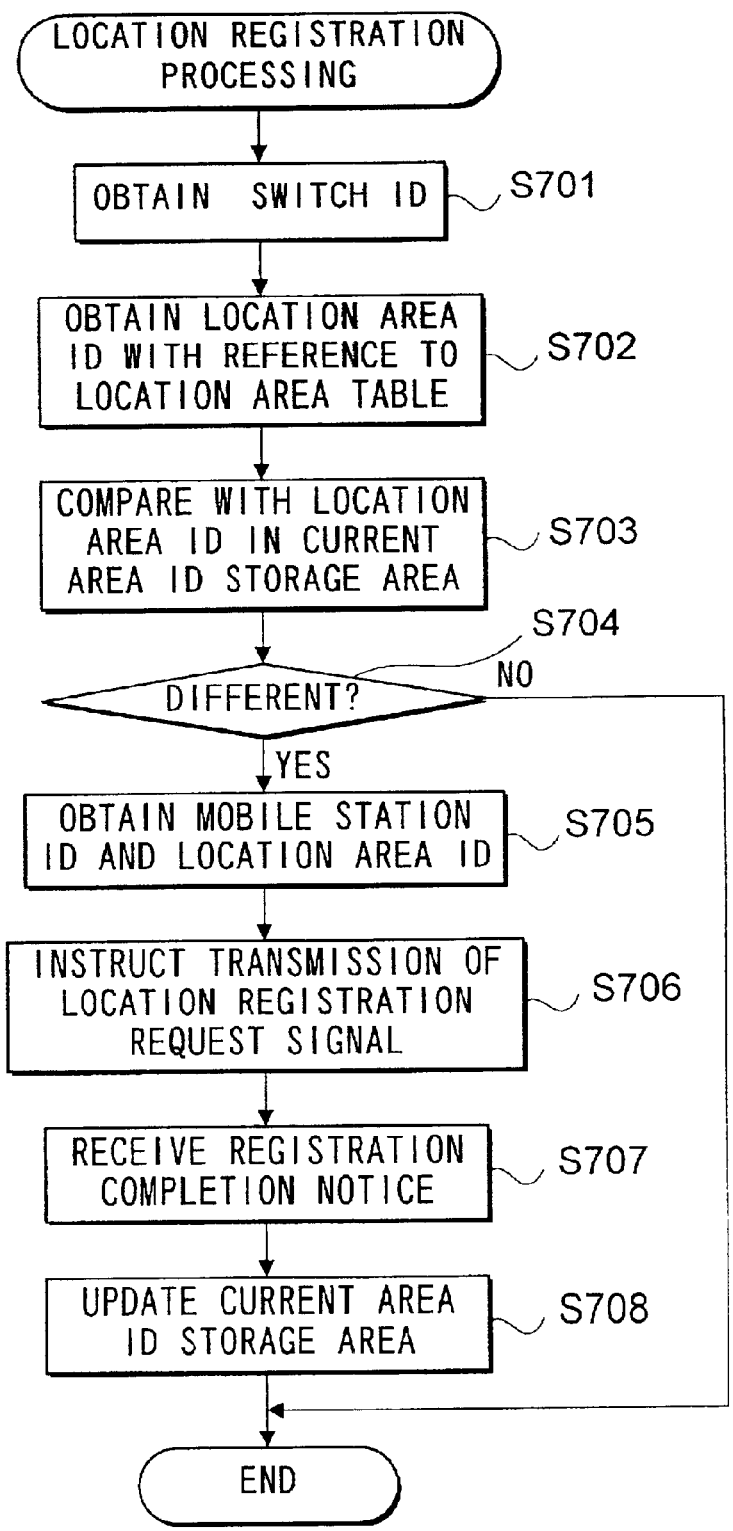
FIG. 24 is a flowchart showing location registration processing performed by the CPU of the cellular phone according to the second embodiment.

FIG. 24 is a flowchart showing location registration processing performed by CPU 909 of cellular phone 90 according to the present embodiment. CPU 909 starts the location registration processing upon intermittent receipt of a control signal from base station 80.

As shown in FIG. 24, CPU 909 first obtains a switch ID contained in the control signal demodulated in radio communication unit 901 (step S701).

Subsequently, CPU 909 refers to location area table 951 stored in location area data storage area 950a, and obtains the present location area ID of cellular phone 90 in accordance with the switch ID obtained in the above described step S701 (step S702).

The processing in the remaining steps S703 to S708 shown in FIG. 24 is identical with that in steps S404 to S409 in the location registration processing of the first embodiment (see FIG. 19), and therefore repeated description thereof is omitted.

The location registration request signal transmitted from cellular phone 90 by means of the above location registration processing reaches LR 60 via base station 80 and switch 71. The current area information of cellular phone 90 stored in home memory 60a of LR 60 is updated in accordance with the mobile station ID and the location area ID contained in the location registration request signal. Further, call connection processing for cellular phone 90 is performed in accordance with the current area information stored in home memory 60a.

As described above, the present embodiment achieves the same effect as that attained in the first embodiment through mere transmission of a switch ID, without transmission of five location area IDs for mobile station usage category numbers "1" to "5" from mobile communication network 30 to cellular phone 90 as described in the first embodiment.

Further, since it is not necessary to transmit a plurality of location area IDs, the quantity of data which are transferred within mobile communication network 30 in relation to location registration can be reduced.

C. Modifications

The above described embodiments of the present invention are merely illustrative examples, and may be modified in various ways without departing from the scope of the present invention. Some readily conceivable modifications will be described below.

<First Modification>

The configuration of the first embodiment may be modified to perform the following control. That is, CPU 909 of cellular phone 90 may have a time keeping function of the current time. Further, mobile station usage category number storage area 901a of cellular phone 90 may store a time zone management table 960 shown in FIG. 25, which is transmitted from management server 50 in step S104 of the contract information reception processing (see FIG. 16).

As shown in FIG. 25, time zone management table 960 stores a mobile station usage category number representing a mobile station usage category of cellular phone 90 for each time zone (i.e., predetermined time period) in one day. Details of time zone management table 960 are determined by the user and the service operator in the course of the contracting procedure for the basic charge discount service. Therefore, at the time of contracting, the user provides the service operator with information such as a time zone in which s/he moves frequently, a time zone in which s/he does not move very much, a time zone in which s/he uses transportation means such as a train or car, and a time zone in which s/he frequently uses cellular phone 90, in addition to her/his own home range, frequently used transportation means, and frequency of incoming calls to cellular phone 90.

FIG. 25 shows an example of time zone management table 960 of cellular phone 90 owned by an office employee engaged in desk work. The time zone of 7 to 8 o'clock in the morning and the time zone of 8 to 9 o'clock in the evening are commuting periods. Since the worker uses a train, the mobile station usage category number is set to "5" only for these time zones. Since the worker generally stays at home or in her/his office in the company in the remaining time zones, the mobile station usage category number is set to "1" for these time zones.

In step S402 of the location registration processing (see FIG. 19), CPU 909 of cellular phone 90 reads a mobile station usage category number corresponding to the current time from time zone management table 960 stored in mobile station usage category number storage area 908a (step S402). Subsequently, CPU 909 obtains a location area ID corresponding to the mobile station usage category number which is obtained on the basis of the current time (step S403).

By virtue of the above described control configuration, the size of a location area used for location registration can be changed in accordance with time zone. There may be further employed a configuration such that CPU 909 of cellular phone 90 has a calendar function for grasping the day of the week and the date; and the size of a location area used for location registration is changed in consideration of the day of the week, national holidays, and end of the month, in addition to the time zones.

<Second Modification>

Figure 26:
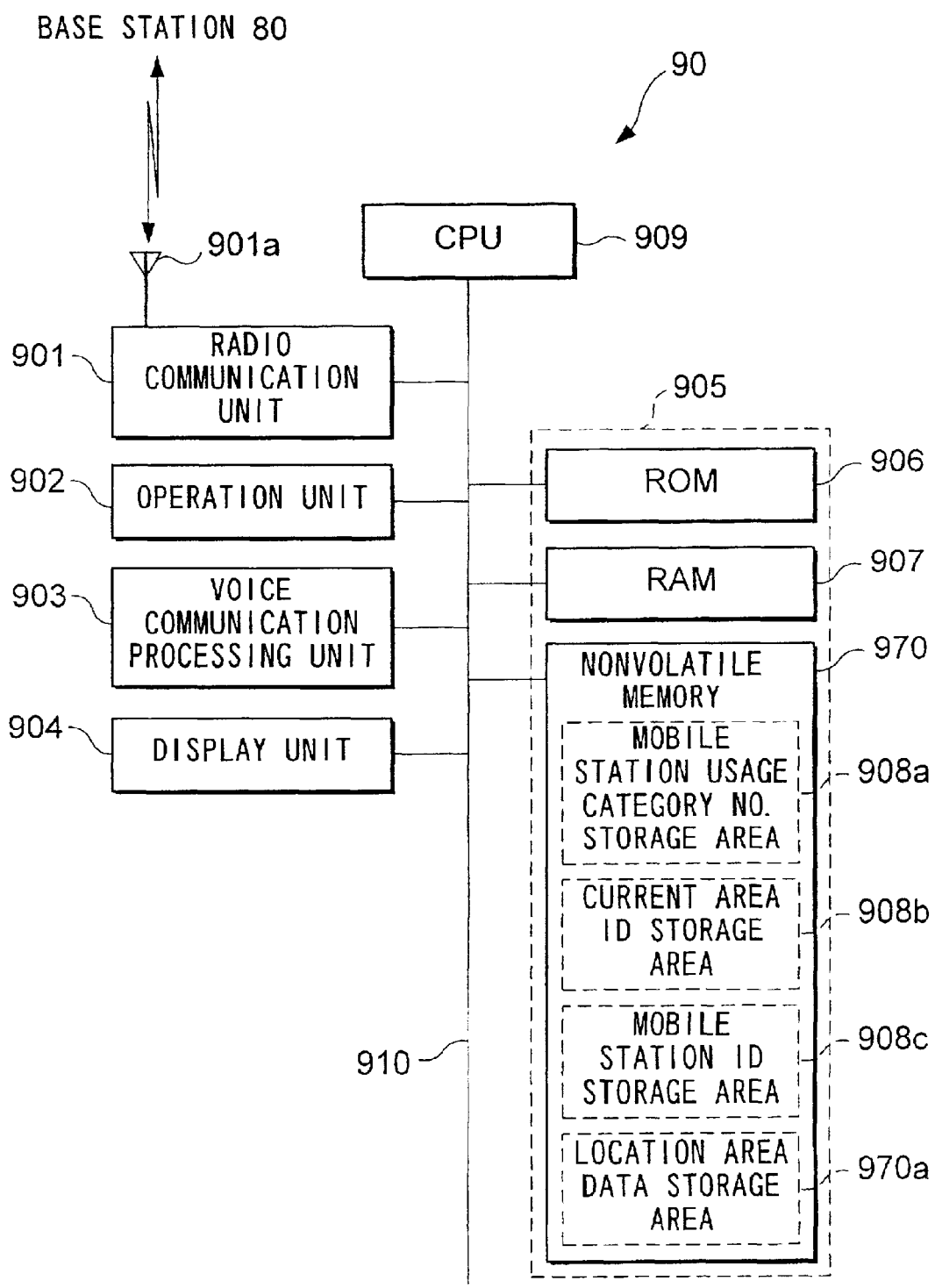
FIG. 26 is a block diagram showing an example hardware configuration of a cellular phone according to a second modification.

The configuration of the second embodiment may be modified so as to perform the following control. That is, cellular phone 90 may have a hardware configuration shown in FIG. 26; nonvolatile memory 970 may include a location area data storage area 970a in addition to mobile station usage category number storage area 908a, current area ID storage area 908b, and mobile station ID storage area 908c, which have been described in the first embodiment.

Location area data storage area 970a stores the same table as location area management table 501b (see FIG. 10) stored in memory 501 of management server 50. That is, in step S104 of the above described contract information reception processing (see FIG. 16), management server 50 transmits, to cellular phone 90 for which a contract for using the basic charge discount service has been placed or cellular phone 90 for which the contents of a contract have been changed, the mobile station usage category number of cellular phone 90 and location area management table 501b, via switching network 70 and base station 80 (step S104). As described above, location area management table 501b shows the correspondence between a location area ID and a switch(es) ID for each of the mobile station usage category numbers "1" to "5."

Cellular phone 90 then stores the received mobile station usage category number of cellular phone 90 in the mobile station usage category number storage area 908a and stores the received location area management table 501b in location area data storage area 970a.

Figure 27:
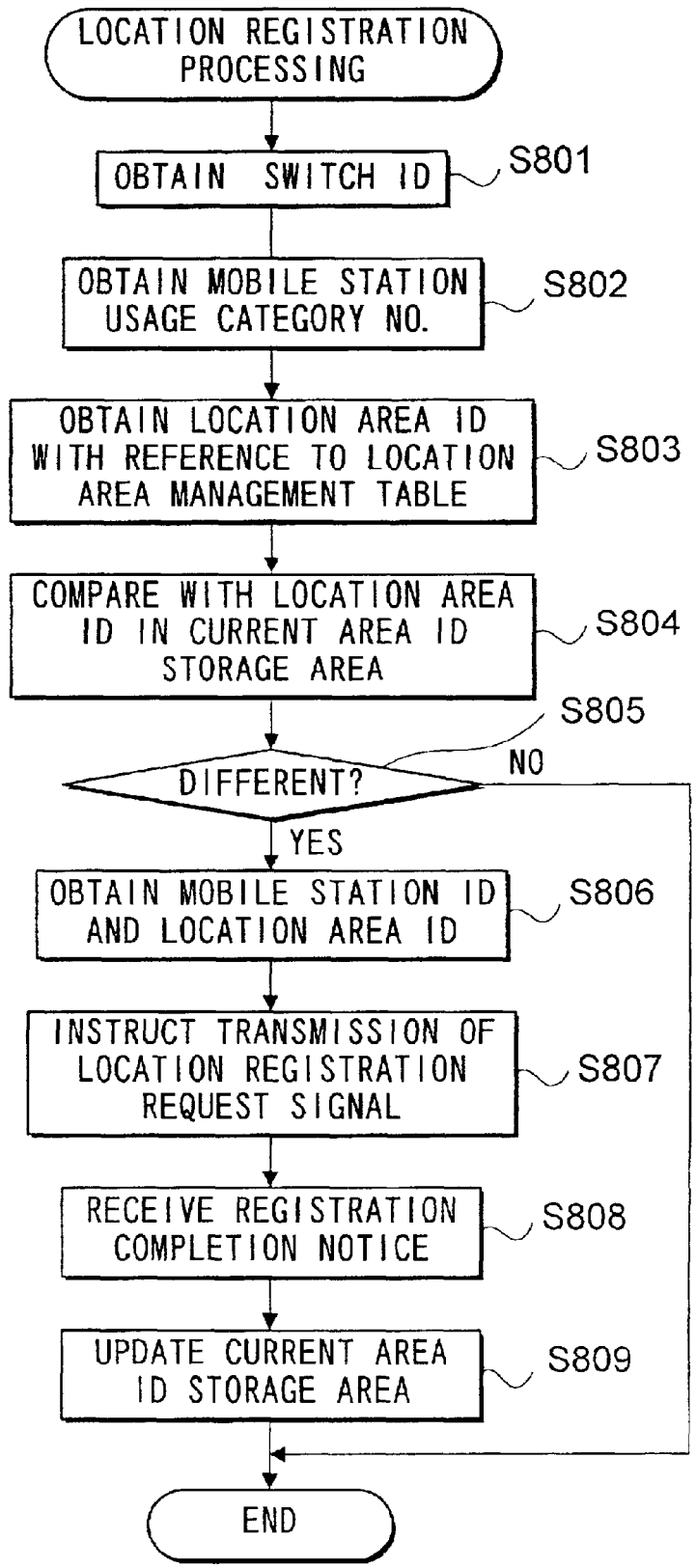
FIG. 27 is a flowchart showing location registration processing performed by the CPU of the cellular phone according to the second modification.

FIG. 27 is a flowchart showing location registration processing performed by CPU 909 of cellular phone 90 according to the second modification. As shown in FIG. 27, CPU 909 first obtains a switch ID contained in the control signal demodulated in radio communication unit 901 (step S801). Subsequently, CPU 909 obtains the mobile station usage category number stored in mobile station usage category number storage area 908a (S802).

Subsequently, in accordance with the switch ID and the mobile station usage category number obtained in the above described step S802, CPU 909 refers to location area management table 501b stored in location area data storage area 970a, and obtains the present location area ID of cellular phone 90 (step 5803).

The processing in the remaining steps S804 to S809 shown in FIG. 27 is identical with that in steps S404 to S409 in the location registration processing of the first embodiment (see FIG. 19), and therefore repeated description thereof is omitted.

Through employment of such a control configuration, the same effect as that attained in the second embodiment can be attained. In addition, since cellular phone 90 stores information on the correspondence between a location area ID and a switch(es.) ID for each mobile station usage category, the configuration of the present modification is particularly effective when the mobile station usage category number of cellular phone 90 is changed in accordance with, for example, time zone as described in the first modification.

<Third Modification>

In the first and second embodiments, intranet 20 is used so as to secure the security of user contract information. However, when input terminal 10 and management server 50 have an authentication function and an encryption communication function, an open network such as the Internet may be used in place of intranet 20. Further, the user contract information may be transferred from input terminal 10 to management server 50 via a PSTN (Public Switched Telephone Network) or an ISDN (Integrated Services Digital Network). Moreover, input terminal 10 may be a facsimile machine. In this case, at a management center provided in mobile communication network 30, the contents of a facsimile are converted to electronic data by means of an OCR (Optical Character Reader) function, and the electronic data are transmitted to management server 50.

<Fourth Modification>

In the first and second embodiments, user contract information including a mobile station usage category number is transmitted from input terminal 10 installed at a sales shop to management server 50 provided in mobile communication network 30. However, the user contract information may be transferred from cellular phone 90 to management server 50 by use of, for example, packet communication.

In this case, a user places a contract for using the basic charge discount service, while accessing management server 50 via her/his cellular phone 90. Therefore, memory 501 of management server 50 stores HTML (HyperText Markup Language) file data for application of use of the basic charge discount service. Further, cellular phone 90 has a browser function. Cellular phone 90 downloads the HTML file data from management server 50 by use of the browser function, and displays a screen for applying use of the service on the liquid crystal display panel. In accordance with the contents of the displayed use application screen, the user inputs a home range of the user, transportation means which the user uses frequently, frequency of incoming calls to cellular phone 90, and a time zone in which the user uses cellular phone 90. Thus, these input information items are transmitted to management server 50 as user contract information.

<Fifth Modification>

In the first and second embodiments, the location registration control method of the present invention is applied as a part of a basic charge discount service. However, the location registration control method of the present invention may be applied in a different manner.

For example, in the course of the contracting procedure for the voice communication service or the packet communication service, by means of questionnaires, the service operator obtains from the user a home range of the user, transportation means which the user uses frequently, frequency of incoming calls to cellular phone 90, and a time zone in which the user uses cellular phone 90. Subsequently, on the basis of the results of the questionnaires, the service operator solely determines the mobile station usage category of cellular phone 90 owned by the user, and utilizes the thus determined mobile station usage category in order to reduce traffic within mobile communication network 30.

In this case, a person working at a sales shop inputs to input terminal 10 the mobile station usage category number determined on the basis of the results of the questionnaires, as well as information regarding the contract for subscription to the voice communication service and/or the packet communication service; and the subscription contract information and the mobile station usage category number are transmitted from input terminal 10 to management server 50 of mobile communication network 30 via intranet 20.

<Sixth Modification>

In the first and second embodiments, cellular phone 90 is used as a communication terminal. However, the present invention can be applied to a PDA (Personal Digital Assistant) or a mobile computer which can perform data communication via mobile communication network 30. Further, the present invention can be applied to a PDC (Personal Digital Cellular) scheme mobile communication system, a PHS (Personal Handyphone System: Registered Trademark) scheme mobile communication system, and mobile communication systems of other types.

What is claimed is:

1. A location registration control method, comprising the steps of:

broadcasting by a mobile communication network in a plurality of types of location areas, area identification information on said plurality of types of location areas, with each location area being included in one of a plurality of types of location area groups overlaying a communication service area, and each location area group being obtained by sectioning said communication service area into location areas by using one of a plurality of types of section patterns;

receiving at a communication terminal located within said communication service area, said area identification information on said plurality of types of location areas corresponding to a location of said terminal;

recording, at said communication terminal, a current time at which said area identification information is received;

selecting at said communication terminal on the basis of said received area identification information on said plurality of types of location areas, a location area identification corresponding to a section pattern predetermined for use with said communication terminal, a plurality of types of section pattern being designated corresponding to a plurality of different time zones for said communication terminal, said selecting step includes obtaining at said communication terminal section information designating a section pattern corresponding to said recorded current time, on the basis of said section information designating section patterns, so as to select a location area identification corresponding to said section information designating a section pattern; and transmitting from said communication terminal to said mobile communication network, when a change in location of said communication terminal is indicated by a change in said location area identification selected in said terminal, a request for registration of said location change of said communication terminal in said network.

2. A location registration control method as claimed in claim 1,
wherein each of said plurality of types of section patterns is used to section said communication service area such that the size of a location area differs depending on the type of section pattern to which it belongs.

3. A location registration control method as claimed in claim 1,
wherein each of said plurality of types of section patterns is used to section said communication service area such that the shape of a location area differs depending on the type of section pattern to which it belongs.

4. A location registration control method as claimed in claim 1, wherein:
said communication service area of said mobile communication network consists of a plurality of radio cells;
each one of said plurality of types of section patterns is used to section said communication service area consisting of said plurality of radio cells into a plurality of location areas, each of which comprises one or a plurality of radio cells; and
each one of said one or a plurality of radio cells is covered by one or a plurality of base stations performing radio communication with communication terminals.

5. A location registration control method as claimed in claim 4,
wherein said step of broadcasting area identification information includes broadcasting, from said one or plurality of base stations and through a control channel, area identification information on said plurality of types of location areas.

6. A location registration control method as claimed in claim 1, further comprising the step of:
notifying, by said mobile communication network, said communication terminal of information specifying one of said plurality of types of section patterns.

7. A location registration control method as claimed in claim 1,
wherein said section pattern predetermined for use with said communication terminal is decided by a user of said communication terminal and a service operator managing said mobile communication network on the basis of a projected usage pattern of said communication terminal.

8. A location registration control method as claimed in claim 1,
wherein said section pattern predetermined for use with said communication terminal is decided by a service operator managing said mobile communication network on the basis of a projected frequency of calls incoming to said communication terminal.

9. A location registration control method as claimed in claim 1,
wherein said section pattern predetermined for use with said communication terminal is decided by a service operator managing said mobile communication network on the basis of a projected movement range of said communication terminal.

10. A location registration control method, comprising the steps of:
storing, at a communication terminal, data showing correspondence between a plurality of grouped location areas and radio cells belonging to each location area, each group being obtained by sectioning a communication service area into location areas by using one of a plurality of types of section patterns;

broadcasting, by a mobile communication network, in each of radio cells constituting said communication service area, cell identification information on said each one of radio cells;

receiving, at said communication terminal located in said communication service area, cell identification information on a radio cell where said communication terminal is presently located;

selecting, at said communication terminal as area identification information of a location area designating its own location on the basis of said received cell identification information and said stored data, a local area identification corresponding to a section pattern predetermined for use with the communication terminal, wherein said stored data includes said predetermined section pattern for said selected location area identification comprising switch IDs related to radio cells so that location registration is performed based on the switch ID as cell identification information; and transmitting from said communication terminal to said mobile communication network, when a change in location of said communication terminal is indicated by a change in said location area identification selected in said terminal, a request for registration of said location change of said communication terminal in said network.

11. A location registration control method as claimed in claim 10,
wherein said data showing said correspondence includes area identification information only on a location area group corresponding to a section pattern predetermined for use with said communication terminal.

12. A location registration control method as claimed in claim 10,
wherein said data showing said correspondence is transmitted from said mobile communication network to said communication terminal.

13. A location registration control method according to claim 10, further comprising:
providing a plurality of section patterns corresponding to a plurality of different time zones for said communication terminal; and
recording, at said communication terminal, a current time at which said area identification information is received to determine a section pattern on the basis of said current time;
wherein said selecting step includes selecting a location area identification information of a location area designating its own location on the basis of said received cell identification information, said stored data, and said section pattern corresponding to said current time.

14. A mobile communication network, comprising:
storage means for storing data showing correspondence between a plurality of grouped location areas and radio cells belonging to each location area, each group being obtained by sectioning a communication service area into location areas by using one of a plurality of types of section patterns;
transmitting means for transmitting, to a communication terminal, said data stored in said storage means;
broadcasting means for broadcasting, in each of radio cells constituting said communication service area, cell identification information of said each one of radio cells;
receiving means for receiving, from said communication terminal, a signal requesting location registration; and
registering means for registering in a location register, in the case of receiving a signal requesting location registration by said receiving means, a location area identification where said communication terminal is located as location information of said communication terminal, said location area identification being included in said signal requesting said location registration, said stored data comprising said section pattern for said registered location area identification comprising switch IDs related to radio cells so that location registration is performed based on the switch ID as cell identification information.

15. A mobile communication network, comprising:
storage means for storing data showing correspondence between a plurality of grouped location areas and radio cells belonging to each location area, each group being obtained by sectioning a communication service area into location areas by using one of a plurality of types of section patterns;
transmitting means for transmitting, to a communication terminal, data of a section pattern decided based on a usage pattern of said communication terminal after, reading said data from said storage means;
broadcasting means for broadcasting, in each of radio cells constituting said communication service area, cell identification information of said each of radio cells;
receiving means for receiving, from said communication terminal, a signal requesting location registration; and
registering means for registering in a location register, in the case of receiving a signal requesting location registration by said receiving means, a location area identification where said communication terminal is located as location information of said communication terminal, said location area identification being included in said signal requesting said location registration, said stored data comprising said section pattern for said registered location area identification comprising switch IDs related to radio cells so that location registration is performed based on the switch ID as cell identification information.

16. A communication terminal, comprising:
receiving means for receiving, from a mobile communication network, area identification information on a plurality of types of location areas corresponding to a location of said terminal, with each location area being included in one of a plurality of types of location area groups overlaying a communication area, each location area group being obtained by sectioning said communication service area into location areas by one of a plurality of types of section patterns;
time keeping means for recording a current time at which area identification information on said plurality of types of location areas is received by said receiving means;
storage means for storing information designating, on the basis of said plurality of types of section patterns, a section pattern of a location area to be used for location registration of said communication terminal;
selecting means for selecting, on the basis of area identification information of said plurality of types of location areas received by receiving means, a location area identification corresponding to said information designating a section pattern stored in said storage means, wherein said selecting means includes selecting, on the basis of area identification information on said plurality of types of location areas received by said receiving means, a location area identification corresponding to section information designating a section pattern after obtaining from said storage means information designating a section pattern corresponding to the current time recorded by said time keeping means; and
transmitting means for transmitting to said mobile communication network, when a change in its own location is indicated by a change in said location area identification selected in said selecting means, a request for registration of said location change in said network.

17. A communication terminal, comprising:
storage means for storing data showing correspondence between a plurality of grouped location areas and radio cells belonging to each location area, after receiving said data from a mobile communication network, each group being obtained by sectioning a communication service area into location areas by using one of a plurality of types of section patterns;
receiving means for receiving from said mobile communication network cell identification information of a radio cell where said communication terminal is presently located;
selecting means for selecting on the basis of said cell identification information received by said receiving means and said data stored in said storage means, a location area identification where said communication terminal is presently located, wherein said stored data includes said predetermined section pattern for said selected location area identification comprising switch IDs related to radio cells so that location registration is performed based on the switch ID as cell identification information; and transmitting means for transmitting to said mobile communication network, when a change in its own location is indicated by a change in said location area identification selected in said selecting means, a request for registration of said location change in said network.

18. A communication terminal as claimed in claim 16 or 17, wherein said communication terminal is a portable phone.

19. A communication terminal comprising logic for:

receiving at a communication terminal located within a communication service area, area identification information on a plurality of types of location areas corresponding to a location of said terminal, each location area being included in one of a plurality of types of location area groups overlaying the communication service area;

recording, at the communication terminal, a time at which said area identification information is received;

selecting an area identification from the received area identification information based on the plurality of section patterns corresponding to the recorded time; and transmitting from said communication terminal to a mobile communication network, when a change in location of said communication terminal is indicated by a change in said location area identification selected in said terminal, a request for registration of said location change of said communication terminal in said network.

20. A communication terminal as claimed in claim 19, wherein each location area group is obtained by sectioning said communication service area into location areas by using one of a plurality of types of section patterns.

* * * * *